US006230260B1

(12) United States Patent
Luick

(10) Patent No.: US 6,230,260 B1
(45) Date of Patent: May 8, 2001

(54) CIRCUIT ARRANGEMENT AND METHOD OF SPECULATIVE INSTRUCTION EXECUTION UTILIZING INSTRUCTION HISTORY CACHING

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/144,664

(22) Filed: Sep. 1, 1998

(51) Int. Cl.[7] .................................................. G06F 9/38
(52) U.S. Cl. ............................................. 712/239; 712/24
(58) Field of Search ............................... 712/239, 23, 24, 712/235, 240

(56) References Cited

U.S. PATENT DOCUMENTS

| | | | |
|---|---|---|---|
| 4,691,277 | 9/1987 | Kronstadt et al. | 364/200 |
| 4,722,050 | 1/1988 | Lee et al. | 364/200 |
| 4,807,110 | 2/1989 | Pomerene et al. | 364/200 |
| 4,894,772 | 1/1990 | Langendorf | 364/200 |
| 4,920,477 | 4/1990 | Colwell et al. | 364/200 |
| 4,943,908 | 7/1990 | Emma et al. | 364/200 |
| 5,093,777 | 3/1992 | Ryan | 395/400 |
| 5,093,778 | 3/1992 | Favor et al. | 395/375 |
| 5,136,696 | 8/1992 | Beckwith et al. | 395/375 |
| 5,136,697 | 8/1992 | Johnson | 395/375 |
| 5,142,634 | 8/1992 | Fite et al. | 395/375 |
| 5,148,538 | 9/1992 | Celtruda et al. | 395/425 |
| 5,163,140 | 11/1992 | Stiles et al. | 395/425 |
| 5,179,680 | 1/1993 | Colwell et al. | 395/425 |
| 5,214,763 | 5/1993 | Blaner et al. | 395/375 |
| 5,261,066 | 11/1993 | Jouppi et al. | 395/425 |
| 5,283,873 | 2/1994 | Steely, Jr. et al. | 395/375 |
| 5,287,467 | 2/1994 | Blaner et al. | 395/375 |
| 5,295,249 | 3/1994 | Blaner et al. | 395/375 |
| 5,297,281 | 3/1994 | Emma et al. | 395/650 |

(List continued on next page.)

FOREIGN PATENT DOCUMENTS

| | | |
|---|---|---|
| 0 394 711 A2 | 10/1990 | (EP). |
| 0 612 013 A1 | 8/1994 | (EP). |
| 58-58666 | 4/1983 | (JP). |

OTHER PUBLICATIONS

Hinton, et al., United States Statutory Invention Registration No. H1291, (Feb. 01, 1994).

(List continued on next page.)

Primary Examiner—Eric Coleman
(74) Attorney, Agent, or Firm—Wood, Herron & Evans

(57) ABSTRACT

A data processing system, circuit arrangement, integrated circuit device, program product, and method utilize a unique prefetch circuit arrangement that speculatively fetches instructions for execution by a processor based upon history data associated with such instructions. In particular, the history data for a given instruction identifies the next instruction that was executed immediately subsequent to the given instruction. An instruction history cache is utilized in some implementations to store history data representing predicted next instructions for a plurality of instructions stored in a memory, and the instruction history cache is operated concurrently with a secondary instruction cache so that predicted and actual next instructions may be retrieved in parallel. Predicted next instructions are speculatively executed when retrieved from the instruction history cache; however, execution of such instructions is terminated if the predicted and actual next instructions do not match. Also, in some implementations, the history data in the instruction history cache that is associated with a particular instruction may represent a predicted instruction to execute at least two cycles subsequent to execution of that particular instruction. In other implementations, history data for use in predicting next instructions may be embedded within instructions themselves, often eliminating the need for a separate instruction history cache.

40 Claims, 9 Drawing Sheets

U.S. PATENT DOCUMENTS

| | | | |
|---|---|---|---|
| 5,301,289 | 4/1994 | Suzuki et al. | 395/400 |
| 5,303,377 | 4/1994 | Gupta et al. | 395/700 |
| 5,317,718 | 5/1994 | Jouppi | 395/425 |
| 5,333,280 | 7/1994 | Ishikawa et al. | 395/375 |
| 5,355,460 | 10/1994 | Eickemeyer et al. | 395/375 |
| 5,367,703 | 11/1994 | Levitan | 395/800 |
| 5,377,336 | 12/1994 | Eickemeyer et al. | 395/375 |
| 5,381,533 | 1/1995 | Peleg et al. | 395/375 |
| 5,386,547 | 1/1995 | Jouppi | 395/425 |
| 5,394,529 | 2/1995 | Brown, III et al. | 395/375 |
| 5,394,530 | 2/1995 | Kitta | 395/375 |
| 5,404,467 | 4/1995 | Saba et al. | 395/375 |
| 5,414,822 | 5/1995 | Saito et al. | 395/375 |
| 5,423,011 | 6/1995 | Blaner et al. | 395/375 |
| 5,423,014 | 6/1995 | Hinton et al. | 395/400 |
| 5,423,016 | 6/1995 | Tsuchiya et al. | 395/425 |
| 5,434,985 | 7/1995 | Emma et al. | 395/375 |
| 5,440,707 | 8/1995 | Hayes et al. | 395/403 |
| 5,442,756 | 8/1995 | Grochowski et al. | 395/375 |
| 5,442,760 | 8/1995 | Rustad et al. | 395/375 |
| 5,446,850 | 8/1995 | Jeremiah et al. | 395/375 |
| 5,748,976 * | 5/1998 | Taylor | 712/240 |
| 5,848,269 * | 12/1998 | Hara | 712/239 |
| 6,112,299 * | 8/2000 | Ebcioglu | 712/236 |

OTHER PUBLICATIONS

Miller, G.D. et al., "High Performance Icache Interface for Superscalar Microprocessors", *IBM® Technical Disclosure Bulletin*, vol. 38, No. 03, (Mar. 1995), pp. 149–150.

Abstract of Yoshida, T. et al., "The approach to multiple instruction execution in the GMICRO/400 processor", *Proceedings of The Eighth TRON Project Symposium*, (Nov. 21–27, 1991), Tokyo, Japan, pp. 185–195.

"VLIW at IBM Research", http://www.research.ibm.com/vliw/home.html, downloaded Aug. 5, 1998.

"Basic Principles of VLIW Architectures", http://www.research.ibm.com/vliw/basic.html, downloaded Aug. 5, 1998.

"VLIW architecture based on tree–instructions", http://www.research.ibm.com/vliw/tree_arch.html, downloaded Aug. 5, 1998.

"The VLIW Prototype", http://www.research.ibm.com/vliw/prototype.html, downloaded Aug. 5, 1998.

* cited by examiner

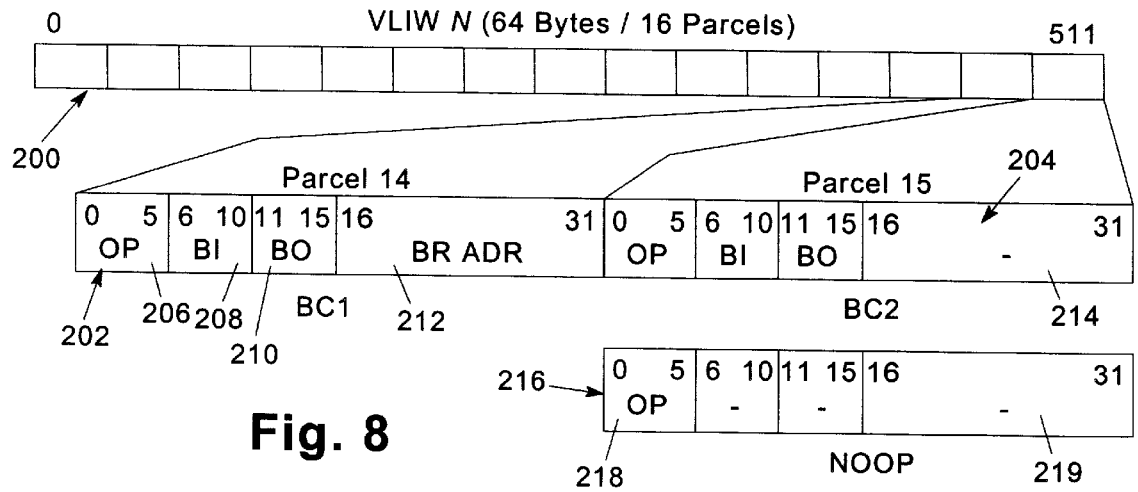
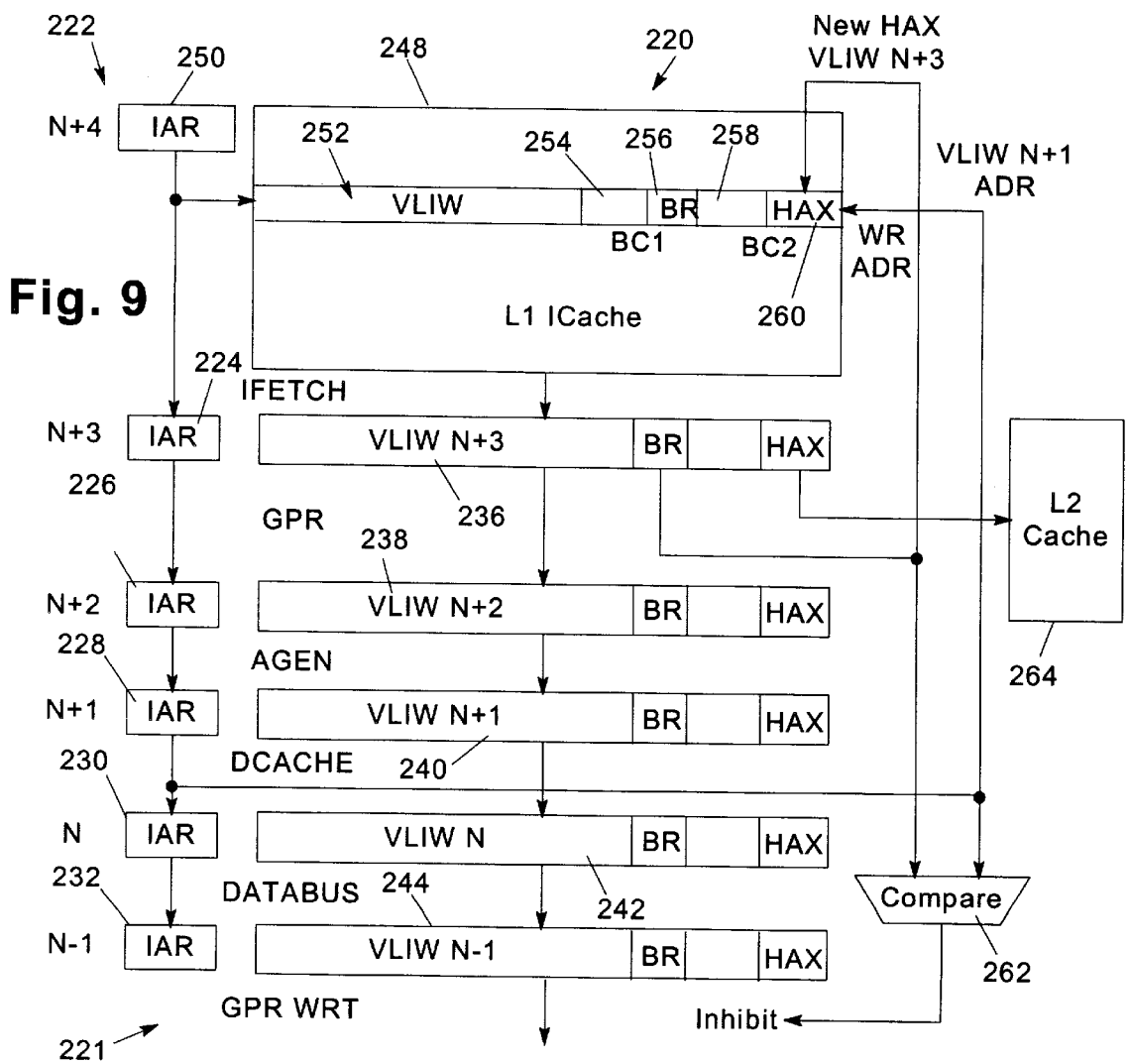

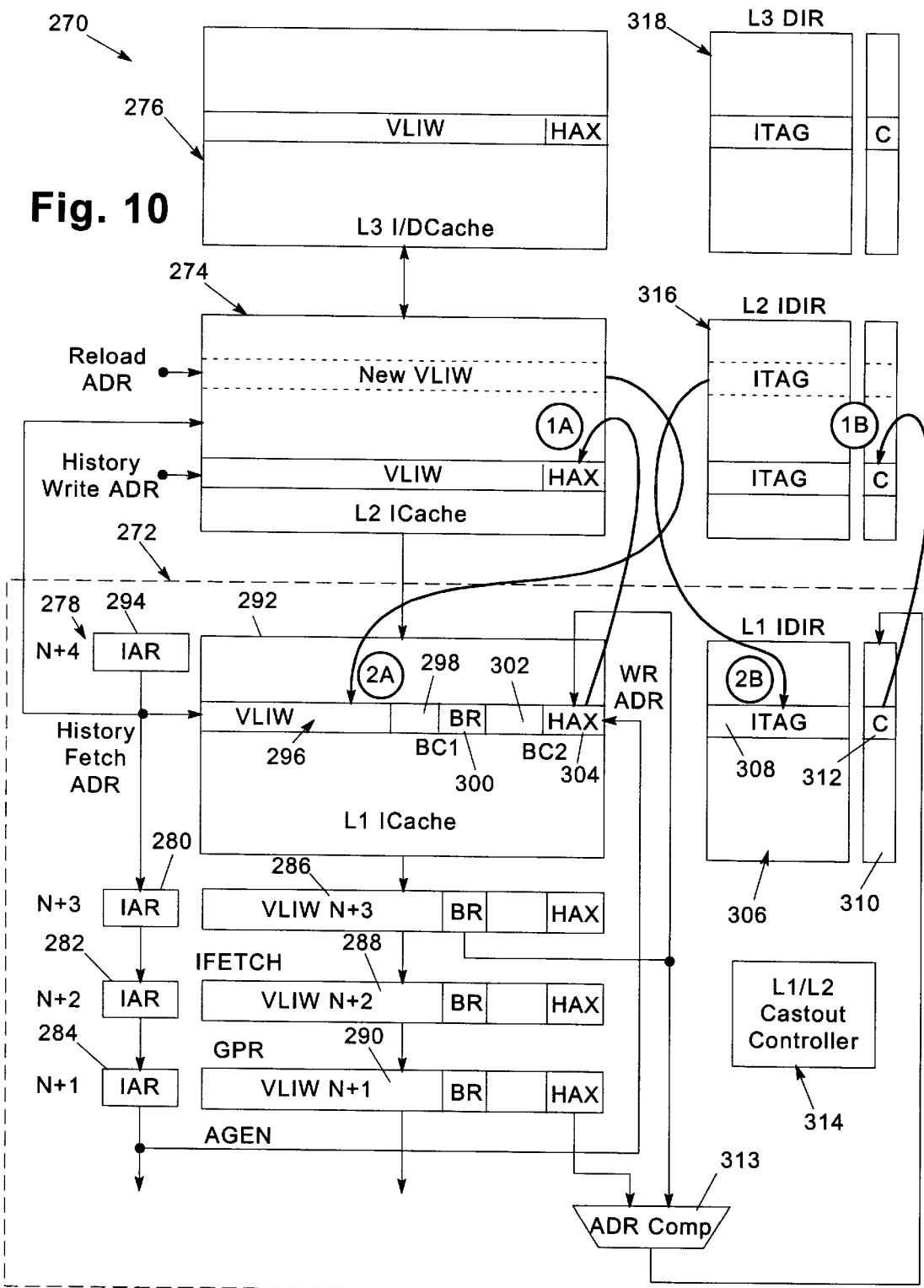

CIRCUIT ARRANGEMENT AND METHOD OF SPECULATIVE INSTRUCTION EXECUTION UTILIZING INSTRUCTION HISTORY CACHING

FIELD OF THE INVENTION

The invention is generally related to integrated circuit device architecture and design, and in particular to branch prediction in a processor integrated circuit device.

BACKGROUND OF THE INVENTION

Users of data processing systems such as computers and the like continue to demand greater and greater performance from such systems for handling increasingly complex and difficult tasks. Greater performance from the processors that operate such systems may be obtained through faster clock speeds, so that individual instructions are processed more quickly. However, relatively greater performance gains have been achieved through performing multiple operations in parallel with one another.

One manner of parallelization is known as "pipelining", where instructions are fed into a pipeline for an execution unit in a processor that performs different operations necessary to process the instructions in parallel. For example, to process a typical instruction, a pipeline may include separate stages for fetching the instruction from memory, executing the instruction, and writing the results of the instruction back into memory. Thus, for a sequence of instructions fed in sequence into the pipeline, as the results of the first instruction are being written back into memory by the third stage of the pipeline, a next instruction is being executed by the second stage, and still a next instruction is being fetched by the first stage. While each individual instruction may take several clock cycles to be processed, since other instructions are also being processed at the same time, the overall throughput of the processor is much greater.

Greater parallelization can also be performed by attempting to execute multiple instructions in parallel using multiple execution units in a processor. Processors that include multiple execution units are often referred to as "superscalar" processors, and such processors include scheduling circuitry that attempts to efficiently dispatch instructions to different execution units so that as many instructions are processed at the same time as possible. Relatively complex decision-making circuitry is often required, however, because oftentimes one instruction cannot be processed until after another instruction is completed. For example, if a first instruction loads a register with a value from memory, and a second instruction adds a fixed number to the contents of the register, the second instruction typically cannot be executed until execution of the first instruction is complete.

The use of relatively complex scheduling circuitry can occupy a significant amount of circuitry on an integrated circuit device, and can slow the overall execution speed of a processor. For these reasons, significant development work has been devoted to Very Long Instruction Word (VLIW) processors, where the decision as to which instructions can be executed in parallel is made when a program is created, rather than during execution. A VLIW processor typically includes multiple execution units, and each VLIW instruction includes multiple primitive instructions known as parcels that are known to be executable at the same time as one another. Each primitive instruction in a VLIW may therefore be directly dispatched to one of the execution units without the extra overhead associated with scheduling. VLIW processors rely on sophisticated computer programs known as compilers to generate suitable VLIW instructions for a computer program written by a computer user. VLIW processors are typically less complex and more efficient than superscalar processors given the elimination of the overhead associated with scheduling the execution of instructions.

Despite the type of processor, another bottleneck on computer performance is that of transferring information between a processor and memory. In particular, processing speed has increased much more quickly than that of main memory. As a result, cache memories, or caches, are often used in many such systems to increase performance in a relatively cost-effective manner.

A cache is typically a relatively faster memory that is coupled intermediate one or more processors and a relatively slower memory such as implemented in volatile or non-volatile memory devices, mass storage devices, and/or external network storage devices, among others. A cache speeds access by maintaining a copy of the information stored at selected memory addresses so that access requests to the selected memory addresses by a processor are handled by the cache. Whenever an access request is received for a memory address not stored in the cache, the cache typically retrieves the information from the memory and forwards the information to the processor. Moreover, if the cache is full, typically the information related to the least recently used memory address is discarded or returned to the memory to make room for information related to more recently accessed memory addresses.

The benefits of a cache are maximized whenever the number of access requests to cached memory addresses, known as "cache hits", are maximized relative to the number of access requests to non-cached memory addresses, known as "cache misses". Despite the added overhead that typically occurs as a result of a cache miss, as long as the percentage of cache hits is high, the overall access rate for the system is increased.

However, it has been found that with much commercial program code such as operating system code and the like, the miss rate for instructions in a cache is often relatively high due to the lack of code reuse and the presence of a large number of branch instructions, which are used to cause a processor to take different instruction paths based upon the result of conditions, or tests, specified in the instructions. Also, a great deal of operating system code is devoted to error and exception handling, and is thus rarely executed, often resulting in a cache temporarily storing a significant number of instructions that are never executed.

It has further been found that for VLIW processors, the miss rate is often even higher because compiling a computer program into a VLIW-compatible format typically expands the program code 2–4 times. Also, the relative frequency of branch instructions in VLIW program code is much higher—typically two branches out of every three instructions verses one branch every 5–6 instructions with a superscalar processor.

One manner of increasing the hit rate for a cache is to increase the size of the cache. However, cache memory is often relatively expensive, and oftentimes is limited by design constraints—particularly if the cache is integrated with a processor on the same integrated circuit device. Internal caches integrated with a processor are typically faster than external caches implemented in separate circuitry. On the other hand, due to design and cost restraints, internal caches are typically much smaller in size than their external counterparts.

One cost-effective alternative is to chain together multiple caches of varying speeds, with a relatively smaller, but faster primary cache chained to a relatively larger, but slower secondary cache. In addition, instructions and data may be separated into separate data and instruction caches. For example, for instructions, some processors implement a relatively small internal level one (L1) instruction cache with an additional external level two (L2) instruction cache coupled intermediate the L1 instruction cache and main memory storage. Typically, an L1 instruction cache has an access time of one clock cycle, and thus, data may be fed to the processor at approximately the same rate as instructions can be processed by the processor. On the other hand, an external L2instruction cache oftentimes has an access time of at least 5 clock cycles, so if a processor is required to rely extensively on memory accesses to an L2 instruction cache, the processor may often stall waiting for data to be retrieved by the cache, thereby significantly degrading processor performance.

As an attempt to minimize the delays associated with retrieving instructions from memory, many processors include prefetch circuitry that attempts to "predict" what instructions will need to be executed in the immediate future, and then to speculatively retrieve those instructions from memory before they are needed by the processor. Branch instructions present the greatest impediments to prefetching instructions, and as a result, prefetch circuitry typically performs an operation known as "branch prediction" to attempt to speculatively determine whether or not a particular instruction path will be taken after a branch instruction.

One manner of branch prediction relies on a branch history table or cache that maintains a history of whether or not previously-executed branch instructions resulted in branches being taken. In particular, it has been found that more often than not branch instruction will take the same instruction path each time it is executed. By predicting that the same path will be taken the next time a particular branch instruction is executed, the prediction is usually successful.

Conventional branch history tables typically store an indication of whether the condition for a particular branch instruction was met the last time the instruction was executed. However, with a conventional branch history table, often the table must be accessed to determine whether a branch was taken, followed by generating the address for the next instruction, and then fetching the instruction stored at the generated address. If the instruction at the generated address is not in the primary cache, the processor will stall waiting for the secondary cache to handle the fetch request.

Consequently, while conventional branch history tables do reduce the overhead associated with branch instructions, some degree of overhead still exists in many circumstances. As a result, processor performance is adversely affected. Furthermore, with VLIW program code, where branch instructions are encountered more frequently, the adverse impact of branch instructions on processor performance is even greater.

Therefore, a substantial need exists for an improved manner of branch prediction that minimizes the overhead associated with branch instructions and maximizes processor performance, particularly for VLIW and superscalar processors and the like.

SUMMARY OF THE INVENTION

The invention addresses these and other problems associated with the prior art by providing a data processing system, circuit arrangement, integrated circuit device, program product, and method that utilize a unique prefetch circuit arrangement that speculatively fetches instructions for execution by a processor based upon history data associated with such instructions. In particular, the history data for a given instruction identifies another instruction that was executed one or more cycles after the given instruction. Based upon the recognition that instruction streams tend to follow like paths the majority of the time, historical information about past next instructions has been found to be a reliable predictor for speculative instruction fetching.

Consistent with one aspect of the invention, an instruction history cache is utilized to store history data representing predicted next instructions for a plurality of instructions stored in a memory that includes primary and secondary instruction caches. The instruction history cache is operated concurrently with the secondary instruction cache in the memory so that predicted and actual next instructions may be retrieved in parallel by a prefetch circuit arrangement. The prefetch circuit arrangement is further configured to supply the predicted next instruction from the instruction history cache to an execution unit for execution thereby subsequent to execution of a first instruction by the execution unit. Also, a prediction verification circuit arrangement coupled to the execution unit is configured to terminate execution of the predicted next instruction by the execution unit if the predicted and actual next instructions do not match.

Unlike conventional branch prediction caches that indicate whether or not a particular branch was taken, an instruction history cache consistent with invention stores the history of the actual instructions that were executed subsequent to branch and other instructions. As a result, the latency associated with calculating an address and initiating an instruction fetch based upon an indication of whether a branch was taken is avoided, often significantly improving instruction throughput.

Moreover, with the above-described configuration, predicted next instructions may be speculatively fetched and executed prior to verification that such instructions are actually the correct instructions to execute. Thus, for any instruction fetch that cannot be satisfied by the primary instruction cache, the time required to retrieve instructions may be shortened relative to if the instruction fetch was simply satisfied by the secondary instruction cache.

Consistent with another aspect of the invention, an instruction history cache is also utilized to store history data representing predicted next instructions. Each predicted next instruction, however, represents a predicted instruction to execute at least two cycles subsequent to execution of a particular instruction in a memory. At least one execution unit is configured to begin execution of a first instruction from the memory, and thereafter to begin execution of second instruction from the memory. Furthermore, a prefetch circuit arrangement is configured to prefetch a predicted next instruction for the second instruction from the instruction history cache concurrently with execution of the first instruction by the execution unit.

Put another way, the history data associated with a given instruction does not predict the next instruction to executed subsequent to that instruction. Rather, it predicts the next instruction to execute subsequent to execution of a future instruction relative to the given instruction. Put yet another way, the history data associated with a given instruction predicts an instruction to execute two or more cycles after the given instruction. It has been found that, in many implementations, speculatively retrieving instructions from an instruction history cache may still result in delays due to the access time of the instruction history cache. Thus, by speculatively retrieving a predicted next—next instruction, or another predicted instruction farther in the future, the latency associated with retrieving such an instruction may be further reduced.

Consistent with an additional aspect of the invention, history data for use in predicting next instructions may be embedded within instructions stored in a memory. An execution unit and a prefetch circuit arrangement may then operate concurrently with one another, with the execution unit executing instructions stored in the memory concurrently with the prefetch circuit arrangement initiating retrieval from the memory of the predicted next instructions identified by the history data of such instructions.

By embedding history data within instructions, the need for a separate instruction history cache may often be avoided, thereby reducing the complexity and number of components in a circuit arrangement. Moreover, in many implementations, e.g., very long instruction word (VLIW) processors and the like, history data may often be embedded in unused portions of VLIW instructions such that the addition of history data requires no additional memory storage above and beyond that required for the instructions themselves.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 8 is a block diagram of a bit mapping for a VLIW instruction suitable for embedding history data within the instruction in a manner consistent with the invention.

FIG. 9 is a block diagram of another VLIW data processing system consistent with the invention, illustrating the components utilized in speculatively retrieving VLIW instructions and updating history data embedded within the VLIW instructions.

FIG. 10 is a block diagram of another VLIW data processing system consistent with the invention, illustrating a multi-level cache hierarchy suitable for maintaining embedded history data in VLIW instructions when the instructions are cached in and out of various levels in the cache hierarchy.

DETAILED DESCRIPTION

Figure 1:
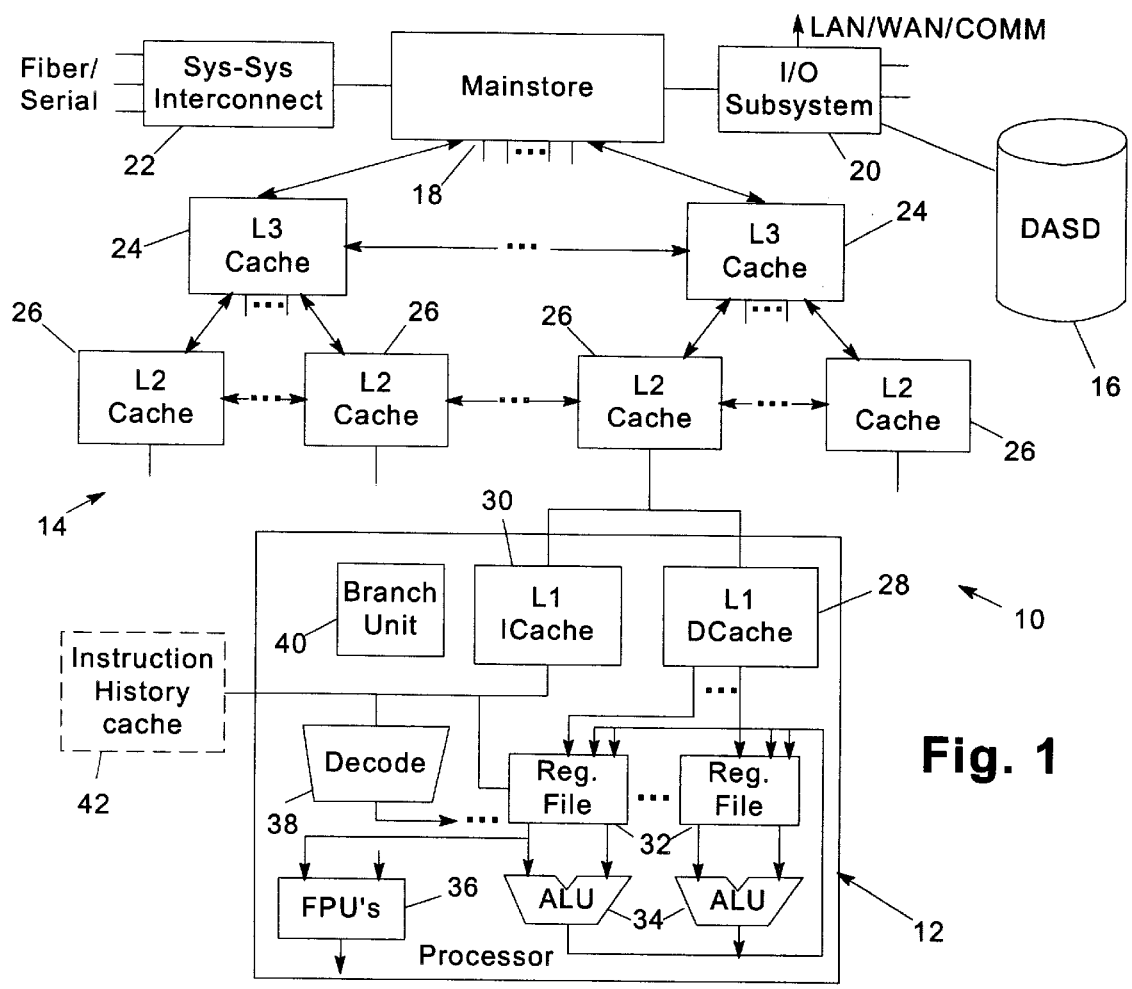
FIG. 1 is a block diagram of a VLIW data processing system utilizing an instruction history cache consistent with the invention.

The various embodiments of the invention described herein generally operate by caching instruction history data used to speculatively fetch and execute instructions. A prefetch circuit arrangement is typically used to speculatively fetch instructions and forward such instructions to one or more execution units in a processor for execution thereby. Moreover, a prediction verification circuit arrangement is typically used to verify the predictions made based on history data, and if necessary, to terminate the execution of mis-predicted instructions.

In some implementations, the history data is cached in a separate instruction history cache. The instruction history cache may be internal or external, and the cache is used to store predicted next instructions, rather than the addresses thereof, to reduce the latency associated with retrieving such instructions.

In other implementations, history data is embedded within instructions themselves, typically in the form of an address that identifies a next instruction, or address index from which the address of the next instruction may be generated. For VLIW processors and the like, this feature often enables history data to be stored in unused portions of instructions with no additional memory storage requirements. Given that cache space is often at a premium, there is thus no adverse storage impact associated with such an implementation.

Moreover, as will become more apparent below, while the history data associated with a given instruction may be used to represent the next instruction to execute immediately subsequent to execution of that instruction, in many implementations it is beneficial to associate history data for another instruction with a given instruction, so that the history data for that instruction represents the next instruction to execute immediately subsequent to execution of the other instruction. Put another way, the history data pertaining to the next instruction to execute immediately subsequent to an instruction may be offset in memory from that instruction.

The invention is suitable for use with a wide variety of processor architectures, including very long instruction word (VLIW) processors and superscalar processors such as reduced instruction set computer (RISC) processors and complex instruction set computer (CISC) processors, etc. The discussion hereinafter will focus on the use of the invention in connection with a VLIW-based architecture; however, implementation of the various aspects and features of the invention in a non-VLIW environment will be apparent to one of ordinary skill in the art upon a reading of the material herein In the context of the invention, a circuit arrangement is an arrangement of analog and/or digital electronic components electrically coupled with one another via conductive traces and/or wires, whether implemented wholly in one integrated circuit device or implemented in a plurality of integrated circuit devices electrically coupled with one another via one or more circuit boards. Moreover, it should be recognized that integrated circuit devices are typically designed and fabricated using one or more computer data files, referred to herein as hardware definition programs, that define the layout of the circuit arrangements on the devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others, and transmission type media such as digital and analog communications links.

Exemplary Data Processing System Environment

Turning now to the Drawings, wherein like numbers denote like parts throughout the several views, FIG. 1 illustrates an exemplary data processing system 10 consistent with the invention. In general, data processing system 10 includes one or more processors 12 coupled to a memory 14 that provides instructions and data for processing by the processor. Memory 14 is typically partitioned into a number of levels to form a memory hierarchy. For example, the greatest volume of memory is typically represented by a mass storage subsystem, such as a direct access storage device (DASD) 16, coupled to a main memory, or mainstore 18 via an input/output (I/O) subsystem 20. Mainstore 18 is typically a relatively large bank of volatile memory, such as dynamic random access memory (DRAM). Other forms of external storage may be accessed via I/O subsystem 20, e.g., various local and wide area networks and other communications facilities, to provide a relatively larger address space for the memory. Additional external information may be interfaced with data processing system 10 via a system to system interconnect 22, e.g., via fiber optic or serial communication links.

Between processor 12 and mainstore 18 is provided one or more levels of cache memories, e.g., level three (L3) caches 24, level two (L2) caches 26, and level one (L1) caches (here partitioned into separate data and instruction caches 28, 30). As represented in FIG. 1, any level in a cache hierarchy may be implemented internal to processor 12 on the same integrated circuit device, as with caches 28, 30. In the alternative, any level in a cache hierarchy may be implemented external to processor 12 and disposed on separate integrated circuit devices, as with L2 and L3 caches 26, 24. Moreover, any given cache may service more than one processor, e.g., as represented by L3 caches 24. In general, it should also be appreciated that, starting with the processor, each level in the memory hierarchy typically has a smaller storage capacity but a faster access time than the next level removed from the processor. Consequently, it is desirable to maintain frequently used data as close as possible to the processor to maximize the efficiency of the memory system.

Processor 12 in FIG. 1 represents a generic processor architecture that includes a number of components common to various types of processors. Data is principally handled via a number of register files 32, with arithmetic operations performed thereon by one or more arithmetic logic units (ALU's) 34. Floating point operations may also be handled by one or more floating point units (FPU's) 36. In general, each of ALU's and FPUs 36 may be considered an execution unit, as is well known in the art.

To manipulate the data in the register files, processor 12 processes various instructions stored in L1 instruction cache (ICache) 30, utilizing decode logic 38 and a branch unit 40, each of which is generally understood in the art, and which will vary depending upon the particular architecture used. In the illustrated embodiment, for example, processor 12 is a very long instruction word (VLIW) processor in which each instruction includes a plurality of parcels to be executed in parallel by multiple execution units in the processor. It should be appreciated that other architectures may be supported, e.g., superscalar RISC or CISC architectures, among others. With these latter architectures, it should be appreciated that additional logic may be required between L1 ICache 30 and decode logic 38 to route appropriate instructions to the various execution units for optimum performance. Other modifications and variations will be apparent to one of ordinary skill in the art.

Instruction History Cache Implementations

As shown in FIG. 1, processor 12 may also be interfaced with an internal or external instruction history cache (IHC) 42 that is utilized to store history data for use in a manner consistent with the invention. IHC 42 in particular stores a plurality of VLIW instructions to be executed after other VLIW instructions. IHC 42 stores copies of VLIW instructions themselves rather than the addresses of those instructions so that additional accesses to the various levels of caches are not required to speculatively retrieve such VLIW instructions.

In the illustrated embodiment, VLIW instructions are 64-bytes in length, including sixteen 32-bit parcels. The cache line length for IHC 42 is one VLIW instruction, or 64-bytes. Typically, IHC 42 is direct-mapped, thereby eliminating the need for a directory. The IHC may be implemented internal to processor 12, or in the alternative, may be an external cache, as best shown in FIG. 1.

Figure 2:
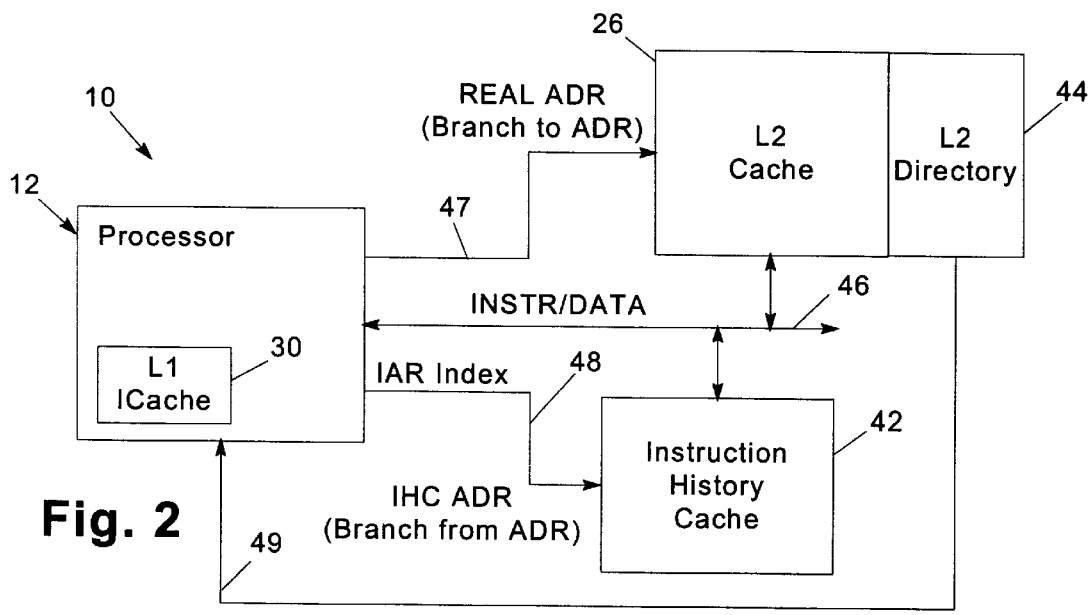
FIG. 2 is a block diagram illustrating the interconnections between the processor, instruction history cache and L2 cache of FIG. 1.

FIG. 2 illustrates in greater detail the instruction and data flow between processor 12, L2 cache 26 and instruction history cache 42. In this embodiment, L2 cache 26 is implemented as an external 32-MB four-way associative cache with a 1 KB, or 16 VLIW, cache line size. As such, L2 cache 26 also includes a directory identified at 44. Instructions and data are passed between processor 12, L2 cache 26 and instruction history cache 42 via a 64-byte wide bus 46. L2 cache 26 and L2 directory 44 are supplied with a 44-bit real address via address lines 47. In this implementation, the L2 cache is addressed via a real address, requiring an virtual/effective address to real address translation in processor 12, as will become more apparent below. Due to the external nature of the L2 cache, the address translation required to access the cache, and the multi-way set associativity of the cache, the L2 cache in this implementation is assumed to have a five cycle access time. It should be appreciated that other L2 caches may have shorter or longer access times consistent with the invention.

The address supplied to L2 cache 26 is also referred to as a "branch to" address, representing the actual next instruction information determined from a currently-executed VLIW instruction. It is this address, or more specifically the instruction stored at this address, that the instruction speculatively retrieved from the instruction history cache must match to verify a correct next instruction prediction. Moreover, L2 directory 44 outputs, in response to the real address supplied by lines 47, a 24-bit directory entry indicating, among other things, whether a cache hit has occurred, and if so, which of the four sets houses the requested cache line.

Instruction history cache 42 is driven by IHC address lines 48, provided with an 17-bit instruction address register (IAR) index that is used to address the cache. Instruction history cache 42 in this implementation is implemented as an 8-MB direct-mapped cache. Consequently, no separate directory is required, which typically reduces the access time for the instruction history cache relative to the directory-based L2 cache. It is assumed for this implementation that the access time of IHC 42 is three cycles, versus the five cycle access time for L2 cache 26.

The IHC address provided to instruction history cache 42 represents a "branch from" address, as it is the address of a current instruction being executed that is used to retrieve a predicted next instruction.

The L1 ICache 30 in processor 12 is implemented as a 64-KB direct-mapped cache. In the illustrated implementation, L1 ICache 30 has a 1-KB (or 16 VLIW) cache line size, and an access time of one cycle.

It should be appreciated that alternate overall and/or cache line sizes may be utilized for each of caches 26, 30 and 42, and that other associativities may be used for each of these caches. Therefore, the invention should not be limited to the particular implementation disclosed herein.

Figure 3:
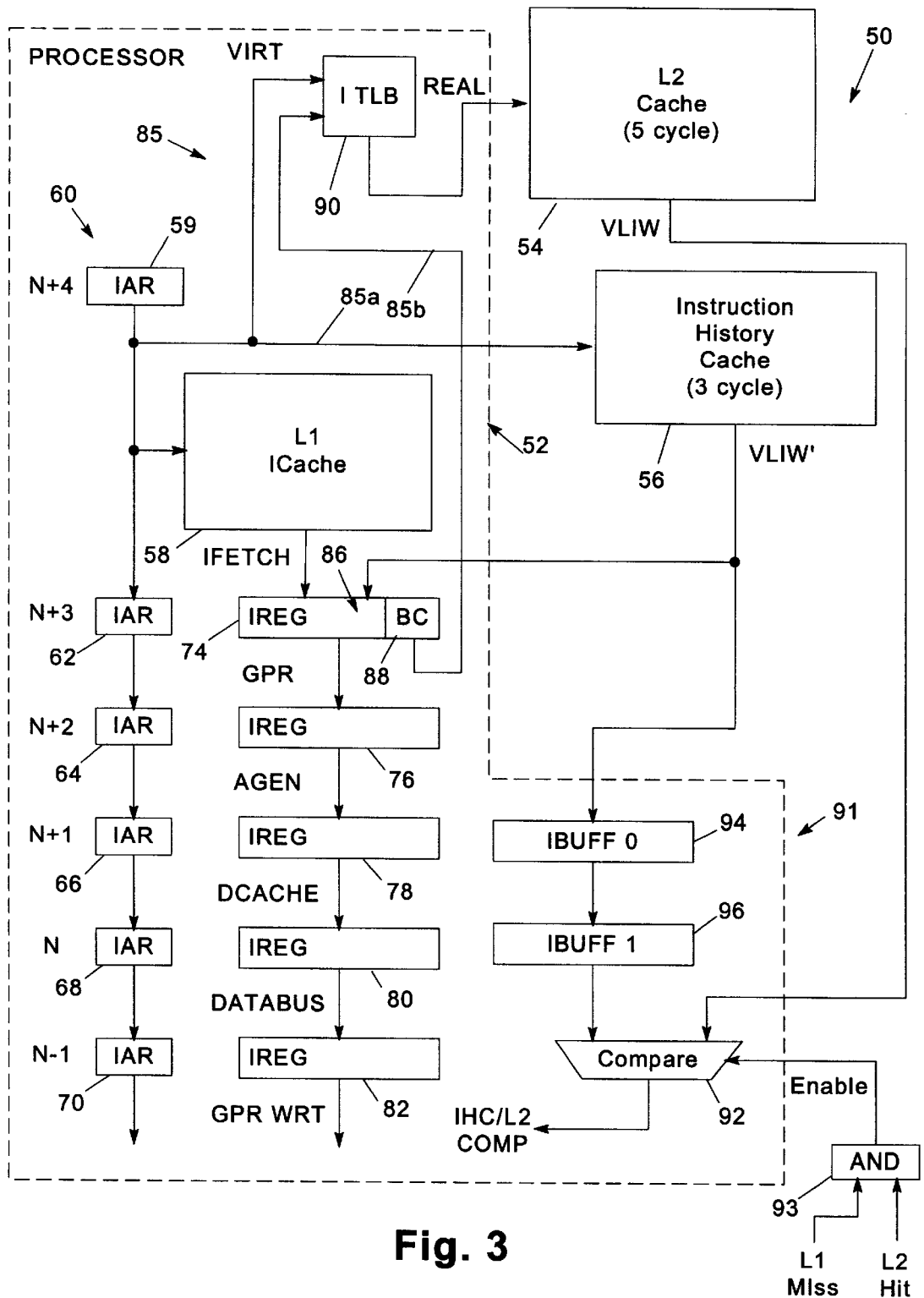
FIG. 3 is a block diagram of the instruction caching hierarchy for another VLIW data processing system utilizing an instruction history cache consistent with the invention, illustrating the components utilized in speculatively retrieving VLIW instructions.

FIG. 3 illustrates another data processing system 50, utilizing a processor 52, L2 cache 54, instruction history cache 56 and L1 ICache 58 that are configured in substantially the same manner as data processor system 10 of FIGS. 1 and 2. As noted in FIG. 3, L2 cache 54 has a 5 cycle access time, and instruction history cache 56 has a 3 cycle access time.

To ensure that the predicted next instruction for a given instruction will be available from the IHC without stalling the processor, data processing system 50 is configured to offset the history data for a given instruction by two instructions to account for the three cycle access time of the IHC. That is, assuming VLIW instructions N−2, N−1, N, N+1, N+2 and N+3 were previously executed in sequence and the history data therefor stored in IHC 56, the history data for VLIW instruction N is associated with VLIW instruction N−2, the history data for VLIW instruction N+1 is associated with VLIW instruction N−1, etc. In short, the history data associated with a given VLIW instruction is the predicted next-next-next instruction to execute after that given instruction.

This association is handled in the illustrated implementation by storing the history data for a given instruction—that is, the predicted next instruction to execute after that given instruction—using the address of the instruction executed two cycles earlier as an index into the instruction history cache. Then, when the address of the instruction last executed two cycles earlier is used to retrieve that earlier instruction from either the L1 ICache or L2 cache, that address is simultaneously provided to the IHC to initiate the retrieval of the predicted next instruction for the latter instruction. With the additional two cycles required to fetch from the IHC, therefore, the predicted next instruction will be returned from the IHC at the appropriate time.

Put another way, for a given VLIW instruction N, the predicted next instruction therefor, VLIW N+1, is stored in the IHC using the address of VLIW N−2. Then, when an attempt is made to retrieve VLIW N−2 from either the L1 ICache or the L2 cache, the address of VLIW N−2 is provided simultaneously to the IHC to begin retrieval of VLIW N+1 therefrom. Assuming in the next two cycles VLIW N−1 and VLIW N are fetched in sequence, on the next cycle the IHC makes VLIW N+1 available just in time to be executed immediately after VLIW N. Consequently, even if the L1 ICache misses on VLIW N+1, the instruction is still available from the IHC, without the delay that would otherwise be required to fetch the instruction from the L2 cache. Moreover, given the offset in which the history data is stored in the IHC, the extra two cycles that would otherwise be required to retrieve the predicted next instruction from the IHC are avoided by in effect starting the IHC access two cycles early.

To generalize this relationship, in the illustrated embodiment it is typically desirable to offset the history data for a given instruction by x−1 additional cycles, where x is the access time of the IHC. Put another way, it is desirable to store as the history data for a given instruction the predicted instruction to execute x cycles in the future.

Thus, in this implementation, instruction history cache 56 is indexed by the address of the instruction currently being fetched as the next instruction to execute, represented by instruction address register (IAR) 59. The address specified in IAR 59 is also simultaneously supplied to L1 ICache 58, as well as to L2 cache 54 via a translation lookaside buffer (TLB) 90 that converts the virtual address stored in IAR 59 into a real address for use in accessing the L2 cache. It should be appreciated that, should virtual addressing not be used, a TLB or other translation mechanism may not be required between processor 52 and L2 cache 54.

Typically, an index, rather than the entire instruction address register, is provided to IHC 56 given that only a subset of the addressable memory space is stored in the caches. For an 8-MB instruction history cache, a 17-bit index may be used from the current address, e.g. bits 41–57 of a 64-bit address. No directory is required, however, for instruction history cache 56 since verification of a correct instruction prediction is made via the prediction verification circuit arrangement described hereinafter.

Similarly, for L1 ICache 58, a 10-bit address index may be provided from IAR 59 to index the cache. It should be appreciated that L1 cache 58 also includes a directory (not shown) to verify whether or not an L1 cache hit has occurred. The use and configuration of such a directory is well known in the art, and thus, need not be described further herein.

IAR 59 forms the first stage of an execution pipe 60 that represents one or more execution units in processor 52. For a VLIW processor, for example, multiple execution units typically operate in parallel to separately handle the various parcels in each VLIW instruction. Each execution unit typically has one or more separate pipes; however, from a functional standpoint, the pipes for such multiple execution units may be considered to be a single pipe as represented in FIG. 3. Consequently, it should be appreciated that any number of execution pipes and/or units may be utilized in a data processing system consistent with the invention, and an implementation of such other pipes and units would be within ability of one of ordinary skill in the art having the benefit of the material disclosed herein.

Each stage of pipe 60 includes storage for an instruction address, as well as a VLIW instruction specified by that address. Pipe 60 is a six-stage pipeline, with the instruction addresses for stages two to six of the pipe stored respectively in instruction address registers 62, 64, 66, 68 and 70, and with the instructions specified by such addresses stored respectively in instruction registers (IREG's) 74, 76, 78, 80 and 82. No separate IREG is utilized for the first stage of the pipe, since the first stage is an instruction fetch into the second stage IREG. An alternate suitable description of pipe 60 is that the pipe is a five-stage pipe, with IAR 62 and IREG 74 forming the first stage of the pipe, and with IAR 59 being excluded from the pipe.

The various stages of the pipe are also identified as being relative to a current instruction N, with an instruction N−x representing an instruction being processed x cycles in advance of the current instruction, and with an instruction N+y representing an instruction being processed y cycles after the current instruction.

Stage one of the pipe is an instruction fetch stage (IFETCH) during which an instruction is fetched from memory (typically the L1 ICache or L2 cache). Stage two of the pipe is a general purpose register file read access stage (GPR). Stage three of the pipe is an effective address generation stage (AGEN). Stage four of the pipe is an L1 data cache (DCache) access stage (DCACHE), and stage five is a data format of data bus stage (DATABUS). Stage six in the pipe is the general purpose register file write access stage (GPR WRT), in which the results of the instruction execution are written back to the general purpose register file, or in general to any other architected register bits. The operations performed during these stages are well known processor operations and are not relevant to an understanding of the invention. Thus, no further discussion of these stages is provided herein.

Furthermore, additional stages, numbers of stages and arrangements of stages may be utilized in other implementations consistent with the invention. For example, for a superscalar processor, the execution pipe may also include a branch address generation stage prior to IFETCH. A VLIW-based architecture, on the other hand, typically does not require a branch address generation stage since the instructions are aligned within the instruction caches and no ordering of instructions need be performed prior to executing the instruction.

A prefetch circuit arrangement 85 is used to initiate retrieval of predicted and actual next instructions respectively from instruction history cache 56 and L2 cache 54. Retrieval of an instruction to execute three cycles in the future, also referred to as the predicted next-next-next instruction, is performed via line 85a, based upon the address index from IAR 59. Retrieval of the actual next instruction from the L2 cache is performed via a line 85b, based upon the "branch to" address specified in the instruction stored in IREG 74 in stage two of the pipe. The branch to address on line 85b is converted into a real address by TLB 90 to access the L2 cache. For example, as represented by an instruction 86 stored in register 74, the branch to address is typically specified in a branch conditional (BC) parcel 88 in the instruction.

Once an instruction fetch is issued to the L2 cache and instruction history cache, each cache will, in time, output the instruction stored at the address provided thereto. For L2 cache 54, the output instruction is the actual next instruction, represented as "VLIW". For instruction history cache 56, the instruction output is a predicted next instruction, represented at "VLIW'". A prediction verification circuit arrangement 91 recieves VLIW and VLIW'. Moreover, VLIW' is provided directly to second stage IREG 74 to begin execution of the predicted next instruction.

Prediction verification circuit arrangement 91 includes a compare block 92 that determines whether VLIW output from L2 cache 54 matches VLIW' output from instruction history cache 56. Since instruction history cache 56 has a 3-cycle access time and L2 cache 54 has a 5-cycle access time, VLIW' will be output to circuit arrangement 91 two cycles prior to VLIW. Thus, to align VLIW' with VLIW, a 2-stage buffer, including instruction buffer registers 94, 96, is interposed between instruction history cache 56 and compare block 92. It should be appreciated that any number of stages may need to be inserted between instruction history cache 56 and compare block 92 depending upon difference in access times between caches 54, 56.

Compare block 92 is enabled by an AND gate 93 that receives an L1 miss signal and an L2 hit signal respectively from the directories for L1 ICache 58 and L2 cache 54. When enabled, compare block 92 outputs an inhibit signal IHC/L2 COMP that is asserted whenever VLIW' does not match VLIW. As a result of this inhibit signal, VLIW', which at this point is stored in stage six IREG 82 of execution pipe 60, is "killed" so that the results of the execution of this instruction are effectively discarded.

In the illustrated implementation, discarding of the results of VLIW' is performed by marking the instruction invalid to inhibit performance of the GPR WRT operation at stage six of the execution pipe, since a write back to the general purpose register file or any other architected register bits is typically the last operation performed as a result of execution of an instruction. This technique is typically used by conventional processors in other circumstances to effectively kill or stall instructions in a pipe, and as such is well known in the art. In other implementations, it may be desirable to terminate execution of VLIW' in other manners. For example, rather than simply invalidating the instruction, it may be desirable to allow the instruction to proceed through completion, and then "undo" the result by restoring the general purpose register file with a backup copy representing the states of the registers prior to execution of the instruction.

It may also be desirable to couple the output of L2 cache 54 to the state machine for the execution pipe and the instruction buffers (not shown) such that the pipe will stall until VLIW is retuned from L2 cache 54. The purpose of this pipe stall is to account for an instruction fetch that also misses on the L2 cache, since such a miss would require an access to the L3 cache and/or mainstore, necessitating an access time greater than five cycles.

Figure 4:
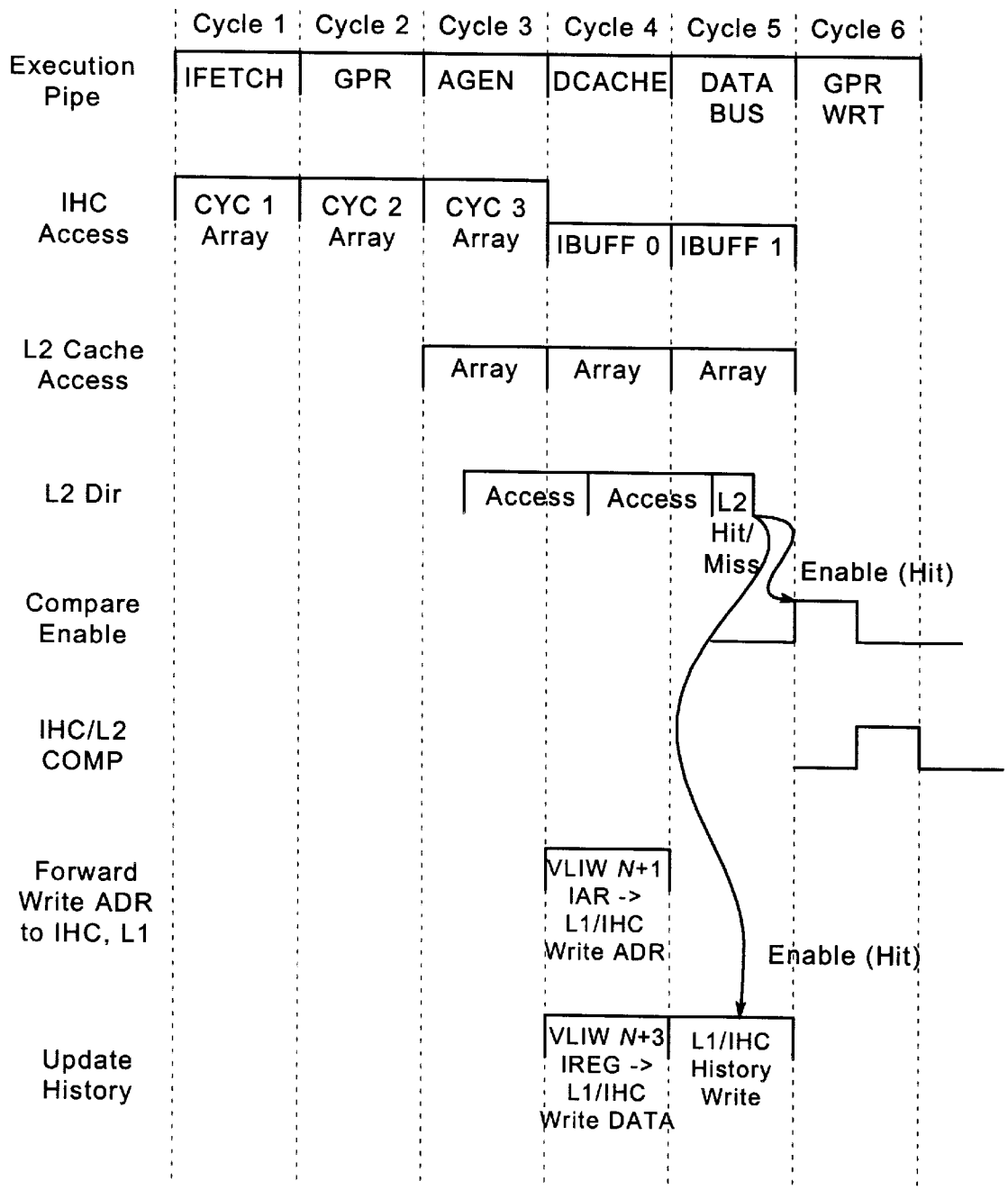
FIG. 4 is a timing diagram illustrating the timing of the sequence of operations performed in during retrieval of VLIW instructions and updating of history data in the VLIW data processing system of FIGS. 3 and 5.

FIG. 4 illustrates the relative timing of operations illustrated in FIG. 3. First, the execution pipe, including the IFETCH, GPR, AGEN, DCACHE, DATABUS and GPR WRT status is shown. The instruction history cache access for the next instruction for the instruction to be executed two cycles in the future, is illustrated as occurring in parallel with the execution pipe, occupying three access cycles, followed by the two buffer stages in the prediction verification circuit 91. Also concurrently shown is an L2 cache access, including 2 cycles required to access the cache, followed by the 3 array cycles within which the cache processes and outputs the result. An access to the L2 directory is also shown occurring in parallel with the L2 cache access. It is to be noted that the L2 directory indicates an L2 hit or miss prior to next instruction by the L2 cache. The compare enable signal, generated from an L2 hit is used to selectively stall the pipes until the L2 fetch is complete upon occurrence of an L1 miss. The compare block is illustrated as operating on half cycles therefrom, with the inhibit signal, denoted IHC/L2 COMP, output one-half cycle after the compare enable signal is asserted. Accordingly, upon reaching the GPR WRT stage of the execution pipe, an inhibit signal is available to either permit or inhibit the write back of results to the GPR file. If an inhibit is indicated, the GPR WRT operation is bypassed, and the result of the instruction is effectively discarded.

Figure 5:
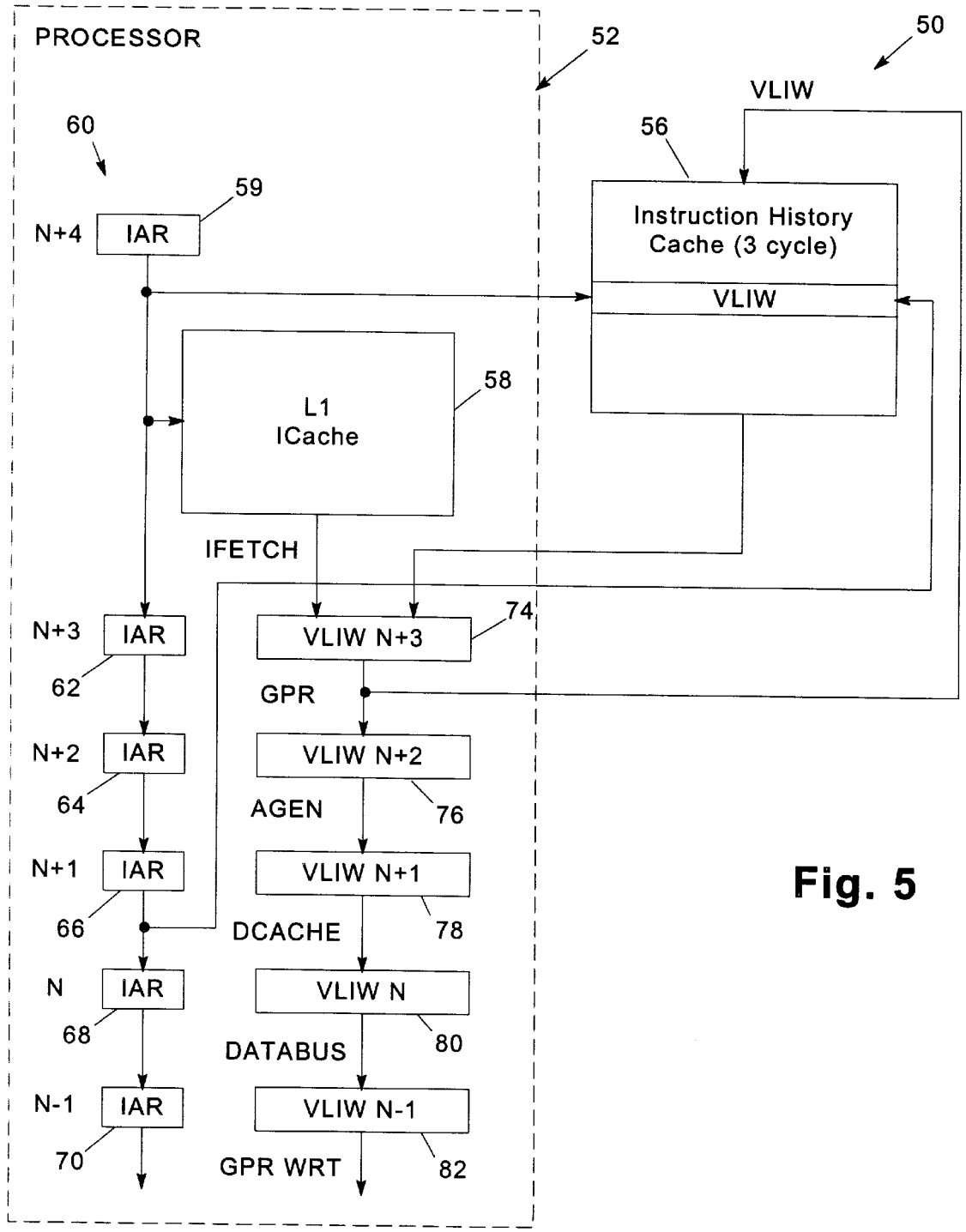
FIG. 5 is a block diagram of the instruction caching hierarchy of FIG. 3, illustrating the components utilized in updating the history data in the instruction history cache.

FIG. 5 illustrates the components involved in the write back of history data into instruction history cache 56 for the purpose of dynamically updating the history data therein. L2 cache 54, which is not relevant to this updating operation, has been omitted from the figure for simplicity.

To store information back into instruction history cache 56, a separate write access port is provided in the instruction history cache. The use and configuration of separate read and write access ports into a cache are well known in the art. The desired offset for storing the actual next instruction data for a given instruction is provided by taking the instruction to write into the instruction history cache, and the address or index at which to write that instruction, from separate stages of the execution pipe. For the illustrated implementation, a two stage differential is used, with the instruction stored in second stage IREG 74 of the execution pipe stored in the IHC at the location specified by the fourth stage IAR 66. The first stage differential accounts for the desire to store the actual next instruction for a given instruction, and the second stage differential accounts for the desired 1-cycle offset of history data in the IHC from that given instruction. In other words, the two stage differential effectively stores the actual next-next-next instruction in the location in the IHC associated with a given instruction.

It should be appreciated that the desired offset may also be achieved by taking the address and instruction from different stages in execution pipe 60, e.g., stages three and five, or stages four and six, etc. Moreover, for different offsets, it should be appreciated that the outputs of different registers may be used in the alternative.

Returning to FIG. 4, the relative timing of the writeback operation is illustrated in greater detail. Specifically, at the fourth (DCACHE), the value of IAR register 66, representing the address of VLIW N+1, is provided as the write address to the L1 ICache and IHC, while the value of IREG 74 at the second stage, representing VLIW N+3, is provided as the data to write into the L1 ICache and IHC. Then, in the next cycle, if the L2 directory hits, the L1 ICache and IHC are written to using the aforementioned address and data, thereby updating the history data to reflect the actual next instruction executed.

Figure 6:
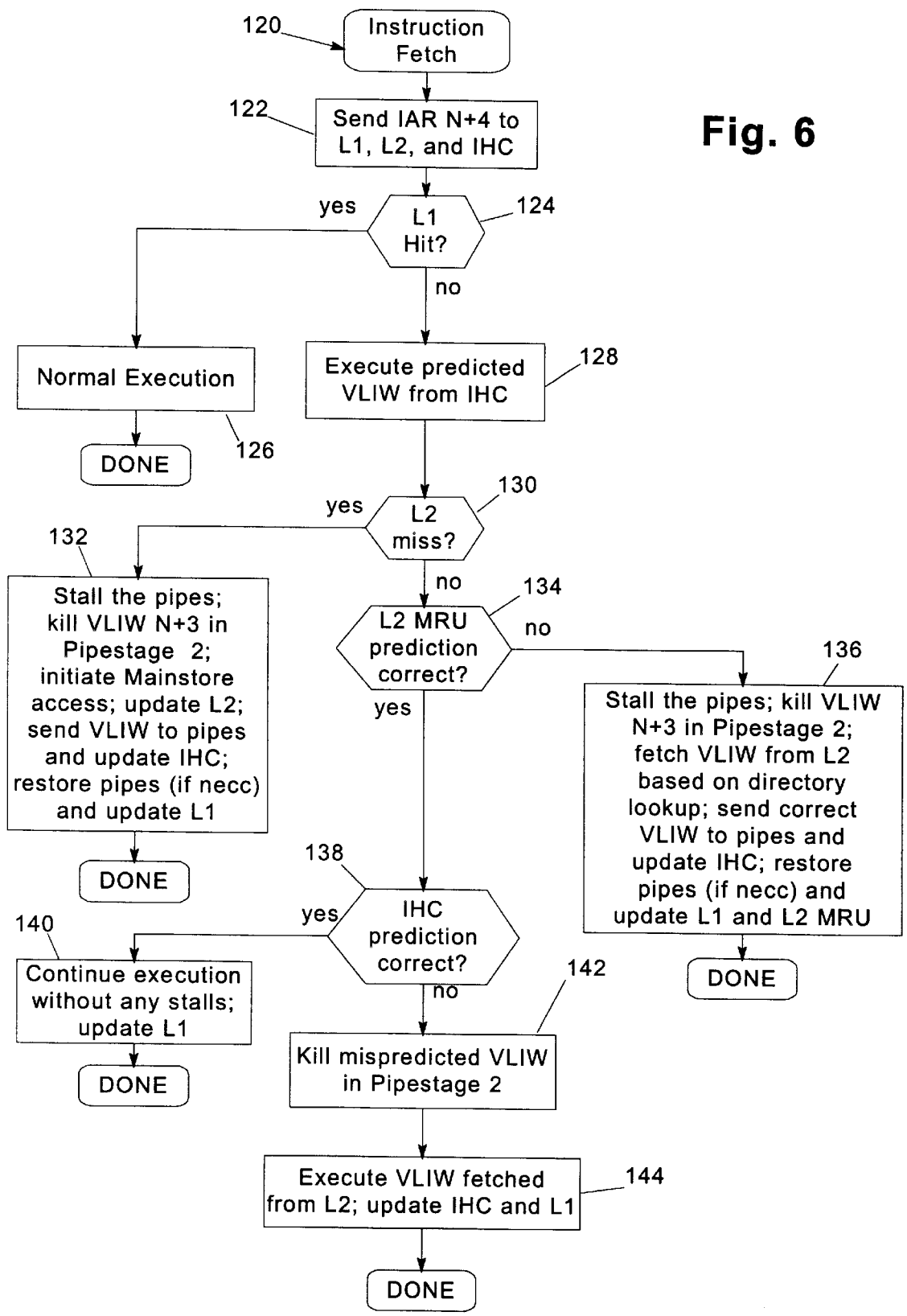
FIG. 6 is a flowchart illustrating the operations performed during an instruction fetch with the data processing system of FIGS. 3 and 5.

FIG. 6 illustrates an instruction fetch operation 120 performed by data processing system 50, illustrating the different program flows that occur based upon whether an instruction fetch hits in the L1 ICache, the L2 cache or the IHC. First, in block 122, the contents of VLIW N+4 stored in IAR 59 (FIG. 3) are forwarded simultaneously to the L1 ICache, the L2 cache and the IHC. Next, in block 124 (and typically in less than one cycle), the L1 ICache directory returns a hit/miss indication. If a hit has occurred, normal execution occurs as shown in block 126, with the instruction fetch satisfied by the L1 ICache in the next cycle. Also, at this time, it may be desirable to update the IHC at this time, or in the alternative, it may be desirable to check the history data in the IHC for a change, and update the IHC only if a change has occurred, to minimize traffic to the IHC.

If a cache miss occurs in the L1 ICache, flow progresses to block 128, where the predicted VLIW output from the IHC the next cycle is fed into the pipe for execution. It should be noted that the access to the IHC to retrieve the predicted VLIW would have been instituted two cycles earlier, i.e., during the dispatch of the address for VLIW N+2 at block 122.

Execution of the predicted VLIW then progresses through the pipe one or more cycles until an indication of an L2 hit/miss is returned from the directory of the L2 cache, represented at block 130. If a miss has occurred, the operations performed in block 132 are performed, given that the predicted VLIW is not correct since the actual requested instruction was not found in the L2 cache. In particular, the pipes are stalled, and the VLIW in stage two of the pipe (shown as VLIW N+3 stored in IREG 74 of FIG. 3) is killed, in any number of manners known in the art. A mainstore access is also initiated to retrieve the requested instruction from a higher level in the memory hierarchy, and once the requested instruction is returned, the L2 cache is updated, the correct VLIW is dispatched to the pipe, the IHC is updated, the L1 ICache is updated, and the pipes are restored. Restoration of the pipes may require only that clocking of the pipes be reinitiated, or in some circumstances, the pipes may need to be restored to a prior state should the pipes have progressed beyond a desirable point.

Returning to block 130, if the L2 hit on the instruction fetch, it is next determined in block 134 whether the L2 MRU prediction was correct. Block 134, which is only performed for associative caches, may be omitted for direct-mapped L2 caches. If the MRU prediction is not correct, the operations performed in block 136 are performed. In particular, the pipes are stalled, and the VLIW in stage two of the pipe (shown as VLIW N+3 stored in IREG 74 of FIG. 3) is killed, in any number of manners known in the art. The correct VLIW is fetched from the L2 cache based upon the directory lookup, the correct VLIW is sent to the pipes, and the IHC is updated. The L1 ICache and L2 MRU array are also updated, and the pipes are restored in any of the manners discussed above.

Returning to block 134, if the MRU prediction was correct, block 138 next determines whether the IHC prediction was correct (i.e., via compare block 92 of FIG. 3). If so, execution can continue without any stalls, with the L1 ICache updated in time by the L2 cache, as shown in block 140. If, however, the prediction is not correct, the mispredicted VLIW in stage two of the pipe is killed in block 142 in the manner discussed above. Next, in block 144, the VLIW fetched from the L2 cache is dispatched to the pipe, with the IHC and L1 updated in the manner discussed above.

Figure 7:
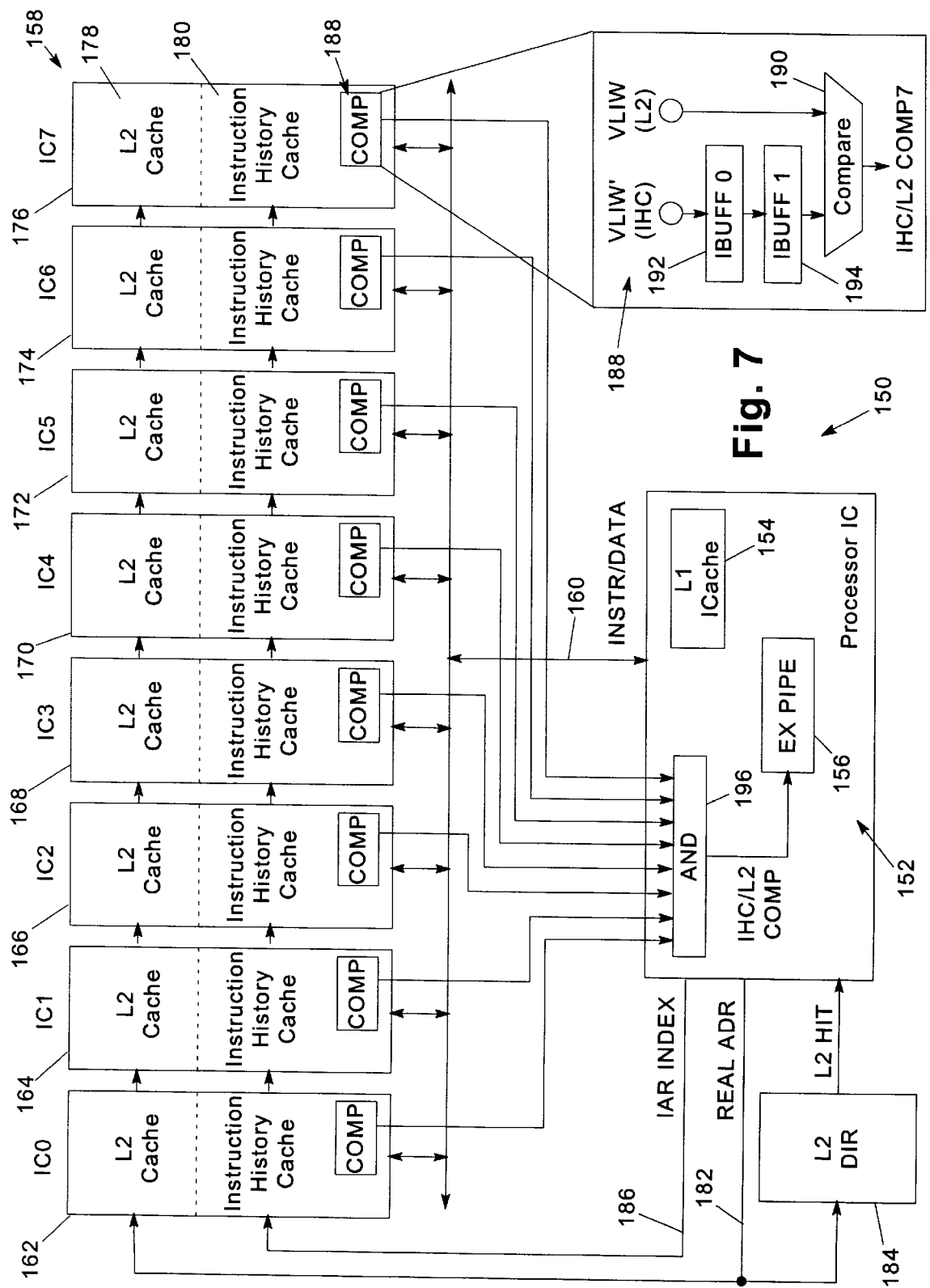
FIG. 7 is a block diagram of another VLIW data processing system consistent with the invention, implementing an integrated external L2/instruction history cache.

FIG. 7 illustrates another data processing system 150 showing a multi-chip integrated L2/instruction history cache implementation. Data processing system 150 includes a processor 152 within which is disposed an L1 ICache 154 and at least one execution pipe 156. An integrated L2/instruction history cache 158 is coupled to processor 152 via a instruction/data bus 160. Cache 158 is implemented using a plurality of memory chips, e.g., chips 162, 164, 166, 168, 170, 172, 174 and 176. Each memory chip is logically partitioned into an L2 cache partition and an instruction history cache partition, e.g., partitions 178, 180 for chip 176. Separate access ports are provided for each of the partitions, with an access port for the L2 cache coupled to address lines 182 from processor 152, which provide a real address for accessing the L2 cache. Lines 182 are also provided to an L2 directory chip 184 that returns a directory entry providing an L2 hit signal to indicate whether or not the access request from the processor hit in the L2 cache.

A separate port controls the instruction history cache, and is controlled via address lines 186 from processor 152. Instruction history cache, as with data processing system 10 above, receives an instruction address register index value to access the cache.

Cache 58 may be implemented, for example, using eight 1-MB SRAM or DRAM memory devices, with each providing eight bytes, or one-eighth, of a 64-byte VLIW over bus 160. Assuming a four-way associative implementation, each set is partitioned ¼-MB, with the most recently used partition also functioning as the instruction history cache. The IHC partition may also be exclusive of the L2 cache, although by allowing one partition to function as both the IHC and the L2 cache, no additional memory is required to implement the IHC. Various alternative cache sizes, partition sizes and/or numbers of chips may be utilized in the alternative.

By implementing an L2 cache and an instruction history cache using a common set of integrated circuit devices, or chips, one advantage that may be obtained thereby is that much of the processing circuitry required to perform the prediction verification function may be shifted from the processor to the chips that implement the cache. For example, a prediction verification circuit arrangement may include a plurality of partial compare blocks, with each disposed in one of the chips, e.g., block 188 for chip 176. Within each compare block, an 8-byte portion of a predicted next instruction output from the instruction history partition is compared with an 8-byte portion of the actual next instruction output from the L2 partition, with an 8-byte compare block 190 used to compare each of the bits in the 8-byte portions output by the L2 and instruction history partitions. Assuming the same difference in access times as discussed above, a pair of instruction buffers 192, 194 may be required to align the predicted and actual next instruction portions. Compare block 190 then outputs a partial IHC/L2 COMP signal that indicates whether the 8-byte portions of the predicted and actual next instructions match. Each partial compare block then outputs a partial compare signal, which is logically AND'ed with the other partial compare signals in an AND block 196 in processor 152 that operates as a master compare block. The output of block 196 forms the overall IHC/L2 COMP inhibit signal used to selectively inhibit or terminate a mis-predicted instruction.

It should be appreciated that in other implementations, various functions in the prefetch and prediction verification circuit arrangements may be allocated to different integrated circuit devices within the system. Therefore, the invention should not be limited to the specific implementations discussed herein.

Embedded Instruction History Implementations

In certain embodiments of the invention, it may be desirable to eliminate the use of a separate instruction history cache altogether, thereby simplifying the design of the instruction fetching mechanism of a processor. In particular, it has been found that in many implementations it is possible to embed history data within instructions themselves, typically within unused bits within the instructions to minimize any expansion of program code due to the addition of history data. This has the effect of the L2 cache incorporating the functionality of an instruction history cache.

VLIW-based architectures are particularly well suited for embedding history data within VLIW instructions given that a large majority of VLIW instructions incorporate some unused space. So long as certain rules are adhered to by a VLIW compiler, it has been found that it is possible to embed history data with little or no effect on the storage requirements for a VLIW program.

Typically, the history data representing a next instruction to execute subsequent to one of the VLIW instructions stored in a memory is represented by an identifier from which the address of such an instruction may be obtained. The full address of a next instruction is typically not required; however, given that only the amount of bits necessary to address the L2 cache are typically necessary to obtain the history data since if a miss on the L2 cache occurs, the next instruction will need to be retrieved from main storage, and the invalidity of any predicted instruction address will be moot.

For example, for a 4-MB L2 cache implemented in system having a 64-bit addressing scheme, no more than a 22-bit address index is typically required to address any given byte within the cache. Furthermore, with a 64-byte cache line and instruction size, and with cache lines and instructions properly aligned, the 6 least significant bits (LSB's) of the 22-bit address index are known to be 0, and thus only 16 bits are required to access any given cache line in a 4-MB L2 cache.

One manner in which the address index may be stored within an instruction is to leave a certain number of bits unused and reserved for history data. For example, for a VLIW instruction, such an instruction typically includes a plurality of parcels that are intended to be executed in parallel with one another by various execution units. VLIW compilers typically assemble VLIW instructions by placing as many parcels as possible in the available slots of an instruction. To ensure adequate free space is allocated for history data in an instruction, therefore, a compiler could be directed to reserve one slot of an instruction for history data.

Despite the fact that a majority of VLIW instructions are never completely filled, leaving one slot of a VLIW instruction always blank will have an adverse impact on processor performance for those instructions that could have been filled with additional parcels but for the addition of the history data to the instruction. However, by implementing an additional compiler rule, a certain amount of free space may be left in a VLIW instruction with relatively less impact on processor performance.

Specifically, it may be desirable to direct a VLIW compiler to assemble into any given VLIW instruction only branch instructions having a branch to address in the same cache line. Then, for any such VLIW instruction having more than branch parcel, the branch to address fields of multiple branch instructions become redundant, and one of such fields may be utilized to store history data with little or no impact on the overall density of parcels within instructions. It is believed that this rule would have little impact on compiler performance since a large majority of VLIW instructions tend to have multiple branch parcels anyway.

For example, an instruction format for a VLIW processor architecture may incorporate 32-bit parcels implementing 32-bit PowerPC-compatible instructions. Consistent with the PowerPC architecture, 16-bits of any branch instructions are assigned to a branch address field from which the address to branch to in response to meeting a predetermined condition is generated. Assuming 64-bit addressing, all branch instructions may be required to branch within a 1-MB address space, with the 64-bit branch to address generated using the 42 most significant bits (MSB's) of the instruction address register concatenated with the 16-bit branch address field, and followed by six zeros (given a 64-byte instruction size).

Assuming the addressing scheme defined above, a VLIW compiler may be created that allocates a fixed number of bits in any instruction to history data with minimal program code expansion. For example, a compiler may be configured to allocate the 16 LSB's of any instruction to history data by adhering to the following rules when assembling parcels into a VLIW instruction:

I. If the VLIW instruction is not full, insert a NOOP operation in the last slot of the instruction.

II. If the VLIW instruction is full, and at least one parcel is a NOOP operation, place the NOOP operation in the last slot of the instruction.

III. If the VLIW instruction is full with non-NOOP operations, and two or more branch parcels exist in the instruction, place one of the branch parcels in the last slot of the instruction (and optionally place all other branch parcels near the end of the instruction but before the last slot so the common branch address for all branch parcels is always located in the same slot).

IV. If the VLIW instruction is full with non-NOOP operations, but fewer than two branch parcels exist in the instruction, attempt to trade parcels with nearby instructions to add additional branch or NOOP parcels to the instruction.

V. If the VLIW instruction is full with non-NOOP operations and fewer than two branch parcels, but no parcels could be swapped into the instruction, insert a NOOP parcel in the last slot of the instruction and move one parcel to a next instruction.

Based upon the fact that over 75% of most VLIW instructions are not completely full, and of the remaining instructions, all but about 10% include more than one branch parcel, it is anticipated that the above rules will tend to expand most VLIW program code less than about 1%.

In other implementations, other manners of locating unused space in a VLIW instruction may be used. For example, in some implementations, some pre-decoding is done on VLIW instructions to expand parcels into relatively larger codes. In some implementations, for a 64-byte VLIW instruction with sixteen 32-bit parcels, the parcels may be expanded into 64-bit codes containing additional bits needed by the execution units. Furthermore, it has been found that in many circumstances, branch instructions, among others, always expand to less than 48 bits. Thus, even if a VLIW instruction is full of parcels and does not meet any of Rules I–IV above, in many circumstances history data may be embedded into unused portions thereof after the parcels are expanded into codes. Thus, history data may be maintained within any level of the memory hierarchy that stores expanded code, e.g., an L2 cache if the predecoder is disposed between the L2 cache and mainstore. In such an instance, typically the L2 cache lines and VLIW instructions are expanded into 128-bytes, such that at least in the L2 cache suitable unused space exists for storing history data. Other manners of locating unused space may be used in the alternative, e.g. utilizing unused bits in operand instructions or mask fields, etc.

FIG. 8 illustrates a 64-byte VLIW instruction 200 including sixteen 32-bit parcels. Instruction 200 is shown having multiple branch parcels, and consistent with the above Rules, the last two slots (for parcels 14 and 15) are filled with such branch parcels. Parcels 14 and 15 are illustrated in greater detail at 202 and 204, with each parcel shown following the general PowerPC instruction format with the first 6 bits of each parcel assigned to an operation field (e.g., field 206 for parcel 202) and the next two sets of 5 bits assigned to bit in (BI) and bit out (BO) fields (e.g., fields 208, 210 for parcel 202). As parcels 14 and 15 are branch parcels, the remaining 16 bits of each parcel are assigned to the branch address field (e.g., field 212 for parcel 202). Given, however, that the branch address field is redundant within a given VLIW instruction that requires all branch instructions to branch to the same cache line, the branch to address field 214 of parcel 204 is available for storing history data therein.

In the alternative, parcel 15 may be a NOOP parcel 216, having a NOOP operation field 218, and an unused field 219 within which the same history data may be stored for the VLIW instruction. It should be appreciated that a wide variety of alternate bit-mappings may be utilized in the alternative.

FIG. 9 illustrates another data processing system 220 configured to store and maintain history data within given VLIW instructions formatted in the manner described above. It should be appreciated that the remainder of the components in system 220 may be configured and arranged similar to data processing system 10 of FIG. 1, with the exception of a separate instruction history cache 42. Returning to FIG. 9, system 220 includes a processor 221 having an execution pipe 222 comprising six stages. Instruction address information is maintained in a sequence of address registers (IAR's) 250, 224, 226, 228, 230 and 232 respectively disposed in the six stages of the pipe. In addition, VLIW instructions for stages two to six of the pipe are stored in instruction registers (IREG's) 236, 238, 240, 242 and 244. An L1 ICache 248 is illustrated with a 64-byte cache line size, which is accessed via an instruction address stored in IAR 250. Shown within L1 ICache 248 is a VLIW instruction 252 which meets the compiler rules defined above, specifically with a next-to-last slot filled with a branch parcel 254 having a branch to address field 256 defined therein, and a last slot filled with a branch or NOOP parcel 258 having a history address index (HAX) field 260 within which is stored the history data to associate with the instruction.

In this implementation, a compare block 262 is utilized to compare the actual next instruction, represented by the branch to address field of the instruction stored in IREG 236, with the predicted next instruction offset by two cycles, represented by the output of IAR 228 (specifically, bits 42–57 thereof, corresponding to the same 16 bits in the branch to address field).

Also, as illustrated by IREG 236, the history address index field thereof is used to access L2 cache 264 each cycle to retrieve the predicted next instruction for the instruction to be executed two cycles in the future. To this extent, L2 cache 264 is configured to have a three cycle access time for history-based accesses. This may be implemented, for example, by utilizing a separate history read access port in the L2 cache that bypasses any virtual to real address translation and any directory access, thereby essentially configuring the L2 cache through this port as a direct-mapped cache that operates in substantially the same manner as an instruction history cache. By storing all VLIW instructions for a given program within a contiguous block in memory, for example, translation may often be avoided to a history access since the bits within a given block will not change due to translation (e.g., if a program was maintained within a contiguous and aligned 16-MB block, the 24 LSB's would typically not change as a result of translation). Also, the MRU prediction for the L2 cache would be used to select the correct set to retrieve in response to the history access without having to access the directory. The use and configuration of a multiple address input L2 cache to implement the functionality described above is within the ability of one of ordinary skill in the art, and thus need not be discussed in greater detail herein.

To update new history address information into the VLIW instructions, the branch to address field of the instruction stored in IREG 236 and the address stored in IAR 228 for the VLIW instruction two cycles previous are respectively provided as the data and address for writing into L1 ICache 248. By storing the actual branch instruction with the VLIW instruction address two cycles previous, the history data is updated with the actual next instruction for the VLIW stored in instruction register 236. Consequently, in this implementation, the embedding of history data within VLIW instructions significantly simplifies the processor architecture, performing the same function as a separate instruction history cache while eliminating the need for such a cache altogether.

It will be appreciated that the implementation of the compiler rules discussed above in a VLIW compiler is well within the abilities of one of ordinary skill in the compiler art based upon a reading of the material herein. It should further be appreciated that other sets of compiler rules, as well as other arrangements and mappings of VLIW instructions may be used to embed history data within instructions consistent with the invention. Moreover, it will be appreciated that the implementation of such variations consistent the other embodiments described herein, will also be apparent to one of ordinary skill in the art.

For the implementation of FIG. 9, it is believed that in many instances it would be desirable to maintain the history data stored in L1 ICache 248 in other levels of the memory hierarchy, given that in many instances the instructions stored in an L1 ICache are often cached out relatively quickly, thus limiting the temporal persistence of the history data stored therein. Thus, it may be desirable to maintain the history data associated with a VLIW instruction by copying the instruction with its associated history data into other levels of the memory hierarchy. Typically, the instruction caching hierarchy in many processor implementations merely discards instructions being cached out of a given level of cache, since the instructions typically not modified in lower level caches, and thus coherency between caches is not a concern. Thus, to permit history data to be maintained in multiple levels of cache, it is only necessary to modify an instruction caching mechanism to copy instructions back into higher level caches as they are cached out of a given cache, similar in many respects to the handling of data in a multi-level data caching hierarchy.

One drawback to this approach, however, is that the number of accesses to the higher level caches increases as instructions are written back into such caches, thereby decreasing the overall performance of the caches. To alleviate this concern, it may be desirable to only copy information back to a higher level cache whenever the history data for an instruction has changed.

For example, FIG. 10 illustrates a data processing system 270 which implements a change bit associated with each instruction stored in a cache to reduce frequency at which VLIW instructions being cast out by a given cache are written back into a higher level of the memory. The change bit is used to determine whether, when a given instruction is being cast out of a given cache, that instruction should be written back into the higher level cache to maintain the history data associated therewith. This scheme is in many respects similar to the use of "dirty" bits on data caches and the like.

Data processing system 270 includes a processor 272 coupled to an L2 cache 274 (here implemented as an instruction cache) and L3 cache 276. Processor 272 includes an execution pipe 278, of which only the first four stages are shown. It is assumed that the remaining two stages are similarly configured to the pipes in the other embodiments disclosed herein. Pipeline 278 therefore includes at least four instruction address registers 294, 280, 282 and 284 corresponding to the first four stages of the pipe, and instruction registers 286, 288 and 290 corresponding to stages two to four of the pipe.

A level one ICache 292 is illustrated, with instructions fetched therefrom based upon an address provided by instruction address register 294. Within ICache 292 are disposed a plurality of instructions, e.g., instruction 296, including two branch parcels 298, 302, with branch parcel 298 including a branch to address field 300, and parcel 302 including a history address index field 304. Also shown in processor 272 is the directory 306 for L1 ICache 292, including a plurality of directory entries, e.g., entry 308 corresponding to instruction 296. L1 instruction directory 306 is configured in the same manner as a conventional instruction cache directory, with the exception that the directory also includes an additional field 310 of change bits, e.g. change bit 312 for directory entry 308.

The prefetching and prediction verification operations performed in data processing system 270 are identical to system 220 of FIG. 9. The history data is also updated in the same manner as discussed above with respect to FIG. 9, namely, the address stored in the previous previous instruction 284 is used to index the L1 ICache, with the address of the actual next instruction to store in the L1 ICache retrieved from the branch to address field of the instruction in IREG 286.

Additionally, a compare is performed in block 313 between the actual next instruction and the predicted next instruction stored in the instruction in IREG 290 to determine whether the history information has changed. If so, the change bit for the corresponding directory entry for the VLIW instruction is set to indicate that the history data has been updated since the instruction was cached into the L1 ICache.

Figure 11:
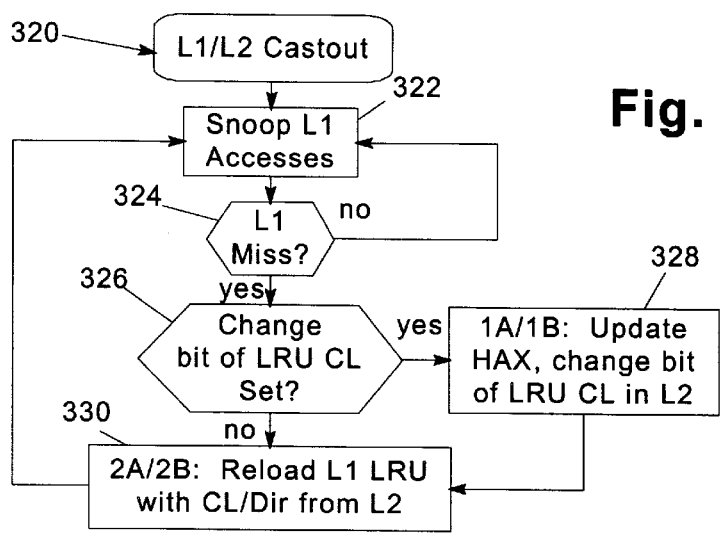
FIG. 11 is a flowchart of the cast-out algorithm used by the L1/L2 castout controller of FIG. 10.

To maintain coherency between the various levels of caches, e.g., between the L1 and L2 caches, a castout controller 314 is utilized in processor 272. The basic operation of controller 314 is illustrated at 320 in FIG. 11. Controller 314 generally operates in the same manner as a castout controller for a data cache to determine whether or not information from a particular cache must be stored in a higher level cache when it is being removed from a lower level cache.

Controller 314 principally operates by snooping all L1 instruction accesses in block 322 and determining whether any such accesses result in an L1 miss (block 324). Whenever an L1 miss occurs, it is determined in block 326 whether the change bit of the least recently used (LRU) cache line is set. If the change bit is set, control passes to block 328 to update the history data for the copy of the LRU VLIW instruction in the L2 cache, and the change bit in the directory entry for directory 316 of L2 cache 274 (FIG. 2) is updated as well to indicate that the L2 cache now includes an updated copy of the VLIW instruction. These operations are represented in FIG. 10 by the arrows labeled 1A and 1B, respectively.

Once the VLIW instruction and directory information in the L2 cache have been updated, control passes to block 330 to reload the least recently used cache line in the L1 ICache with the new VLIW information and directory entry therefor from the L2 cache (including the change bit). These operations are represented in FIG. 10 by the arrows 2A and 2B.

Returning to block 326, if the change bit of the least recently used cache line in the L1 cache is not set, block 328 is by-passed, and the information therein discarded as a result of the reload operation performed in block 330.

Returning to FIG. 10, it should be appreciated that, so long as the history data has not been updated, the write back operation of a cast out cache line to the L2 cache is avoided, thereby decreasing the number of accesses to the L2 cache and improving the performance thereof. In particular, given that history data tends to stabilize after a period of time based upon the likelihood of a given branch always following the same path in future executions, history data will not tend to change very frequently, and thus the number of L2 accesses will be minimized.

It should be appreciated that a similar operation may be performed to maintain coherence between the L2 and L3 caches if desired, using the same algorithm described above to update directories 316 and 318 for L2 cache 274 and L3 cache 276. Moreover, it may be required to implement an additional castout controller in processor 272 to handle such operations. In the alternative, the cast out operation may be offloaded to a separate component to perform the same functionality.

Figure 12:
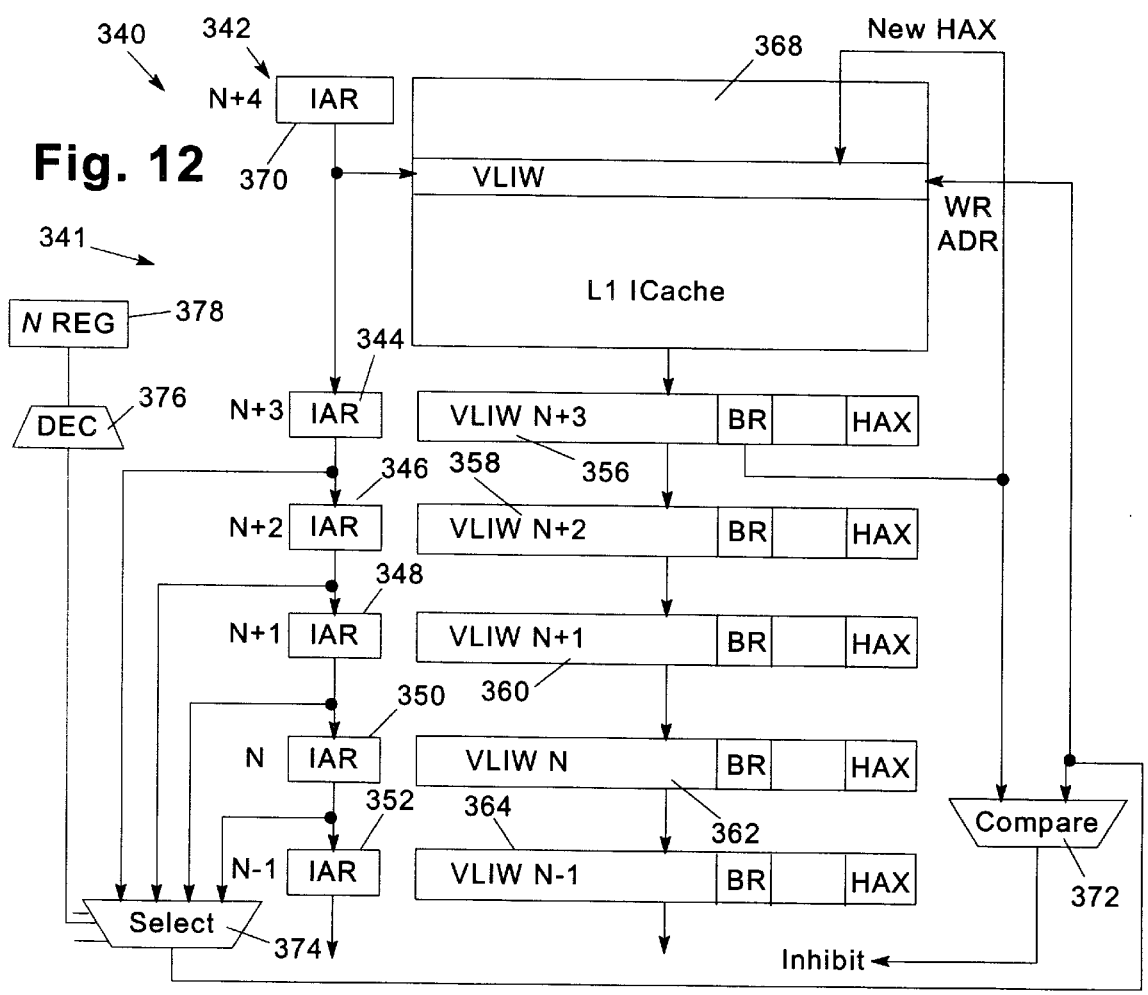
FIG. 12 is a block diagram of another VLIW data processing system consistent with the invention, illustrating a history data updating mechanism with controllable offset.

Now turning to FIG. 12, a data processing system 340 is presented to illustrate an additional feature whereby a variable offset in the history data may be provided to enable a processor 341 to operate with different types of L2 caches. For example, a given processor core design may be used in multiple implementations with L2 caches having different access times relative to the availability of history data. Thus, rather than maintaining a fixed 2-cycle offset as with the embodiments described above in connection with FIGS. 9 and 10, it may be desirable to permit any number of offsets, e.g., 2, 3, 4 or 5 offsets, as necessary. For processor 341, this is implemented by utilizing a multiplexing scheme that provides the writeback address for the L1 ICache to be taken from various stages of an execution pipe 342.

Pipe 342 is illustrated as including six stages, utilizing IAR's 370, 344, 346, 348, 350 and 352, and IREG's 356, 358, 360, 362 and 264. A level 1 ICache 368 is accessed by IAR 370, and a compare block 372 is utilized to verify the prediction made based upon the history data. As with the implementation described in connection with FIG. 9, the branch to address of the instruction stored in the IREG 356 is utilized as the new history information and the actual (correct) address with which to compare the predicted address. However, instead of taking the output of the instruction address register from only one stage of pipe 342, separate address lines output from IREG's 344, 346, 348 and 350 are provided to a select block 374, the output of which is fed to compare block 372 and the write address for L1 ICache 368.

Select block 374 is controlled via a decoder 376, having a state selected by an N-bit register 378. In this implementation, with four possible addresses to be output by block 374, a 2-bit register may be utilized. It is typically desirable for register 378 to be loaded at start-up to maintain a fixed number of cycles during the operation of the device. With the configuration shown in FIG. 12, an N value of 0 would represent a 1-cycle offset, with N values of 1, 2 and 3, respectively representing 2-, 3- and 4-cycle offsets. As such, processor 341 of data processing system 340 may be utilized in a wider variety of applications.

Various additional modifications may be made to the illustrated embodiments without departing from the spirit and scope of the invention. For example, it may be desirable, when storing a history address index as history data in an instruction, to inhibit an access to the L2 cache whenever it is detected that a sequential operation will occur—i.e., when it is detected that no branch will occur subsequent to execution of a given instruction. This would further reduce the number of accesses to the L2 cache and thereby increase the relative performance thereof.

Also, in other implementations, should the history change relatively frequently, it may be desirable to include an additional confirmation bit that indicates that the last change to the history data was useful. Thus, whenever a compare was done, a confirmation bit may be used to indicate that the last change was positive.

Various additional modifications may be made to the illustrated embodiments without departing from the spirit and scope of the invention. Therefore, the invention lies in the claims hereinafter appended.

What is claimed is:

1. A circuit arrangement, comprising:
   (a) a memory having stored therein a plurality of instructions, the memory including primary and secondary instruction caches, wherein the secondary instruction cache has an access time that is greater than that of the primary instruction cache;
   (b) an instruction history cache having stored therein a plurality of predicted next instructions, each representing a predicted instruction to execute subsequent to an instruction stored in the memory;
   (c) at least one execution unit configured to execute a first instruction from the plurality of instructions in the memory;
   (d) a prefetch circuit arrangement configured to initiate retrieval, from the instruction history cache and the secondary instruction cache respectively, of predicted and actual next instructions to execute subsequent to the first instruction, the prefetch circuit arrangement further configured to supply the predicted next instruction to the execution unit for execution thereby subsequent to execution of the first instruction; and
   (e) a prediction verification circuit arrangement configured to receive the predicted and actual next instructions respectively from the instruction history cache and the secondary instruction cache and terminate execution of the predicted next instruction by the execution unit if the predicted and actual next instructions do not match.

2. The circuit arrangement of claim 1, wherein the plurality of instructions are Very Long Instruction Words (VLIW's).

3. The circuit arrangement of claim 1, wherein the primary cache includes a level one instruction cache, and wherein the secondary cache includes a level two cache.

4. The circuit arrangement of claim 1, further comprising a history update circuit arrangement configured to store the actual next instruction as the predicted next instruction for the first instruction.

5. The circuit arrangement of claim 4, wherein the history update circuit arrangement is configured to store the actual next instruction as the predicted next instruction only if the actual next instruction differs from the predicted next instruction.

6. The circuit arrangement of claim 4, wherein the instruction history cache has an access time of N cycles, and wherein the history update circuit arrangement is configured to offset the predicted next instruction for the first instruction by N−1 instructions in the instruction history cache such that the predicted next instruction for the first instruction is accessed in the instruction history cache via an address of a second instruction executed N−1 cycles prior to the first instruction.

7. The circuit arrangement of claim 6, wherein the execution unit comprises an execution pipe comprising a plurality of stages, wherein the instruction history cache includes a write access port configured to store an instruction supplied at a data input at an address supplied at an address input, and wherein the history update circuit arrangement comprises a set of data lines electrically coupling an instruction register in one of the plurality of stages of the execution pipe to the data input of the write access port, and a set of address lines electrically coupling an address register in another of the plurality of stages of the execution pipe to the address input of the write access port, wherein the stage to which the set of data lines is coupled is offset by N−1 cycles from the stage to which the set of address lines is coupled.

8. The circuit arrangement of claim 6, wherein the execution unit comprises an execution pipe comprising a plurality of stages, wherein the instruction history cache includes a write access port configured to store an instruction supplied at a data input at an address supplied at an address input, and wherein the history update circuit arrangement further comprises a selector circuit arrangement interposed between the execution pipe and the instruction history cache, the selector circuit configured to selectively couple at least one of the data input and the address input of the write access port to different stages of the execution pipe to controllably offset the predicted next instruction for the first instruction by one or more instructions in the instruction history cache in response to a selector input.

9. The circuit arrangement of claim 1, wherein the prediction verification circuit includes a compare block configured to receive the predicted and actual next instructions respectively from the instruction history cache and the secondary instruction cache and output in response to a mismatch therebetween an inhibit signal to the execution unit to terminate execution of the predicted next instruction.

10. The circuit arrangement of claim 9, wherein the execution unit includes an execution pipe having a register write stage that stores a result of execution of the predicted next instruction, and wherein the execution unit is configured to inhibit the register write stage for the predicted next instruction in response to the inhibit signal from the compare block.

11. The circuit arrangement of claim 9, wherein the compare block is configured to be enabled by a miss signal from the primary cache and a hit signal from the secondary cache.

12. The circuit arrangement of claim 9, wherein the secondary cache has an access time that is M cycles greater than the instruction history cache, and wherein the prediction verification circuit arrangement further comprises an M-stage buffer interposed between the instruction history cache and the compare block.

13. The circuit arrangement of claim 1, wherein the execution unit is configured to output an address to the primary, secondary and instruction history caches to concurrently initiate concurrent access operations the primary, secondary and instruction history caches.

14. The circuit arrangement of claim 1, wherein the execution unit is disposed in a first integrated circuit device, the circuit arrangement further comprising a plurality of memory devices coupled to the first integrated circuit device, wherein each of the plurality of memory devices includes a portion of an address space for each of the secondary and instruction history caches, with each memory device storing a portion of each of the predicted and actual next instructions, and wherein the prediction verification circuit comprises:

(a) a plurality of partial compare blocks respectively disposed in the plurality of memory devices, each partial compare block configured to receive the portions of the predicted and actual next instructions stored in the associated memory device and output in response to a mismatch therebetween a partial compare signal to the first integrated circuit device; and (b) a master compare block, disposed in the first integrated circuit device and configured to combine the partial compare signals from the plurality of partial compare blocks to generate an inhibit signal for selectively terminating execution of the predicted next instruction if any of the partial compare signals indicate a mismatch between any portions of the predicted and actual next instructions.

15. A data processing system comprising the circuit arrangement of claim 1.

16. A program product, comprising a hardware definition program that defines the circuit arrangement of claim 1; and a signal bearing media bearing the hardware definition program.

17. The program product of claim 16, wherein the signal bearing media includes at least one of a transmission type media and a recordable media.

18. A data processing system, comprising:

(a) a mainstore having stored therein a plurality of instructions;

(b) a secondary cache coupled to the mainstore and storing at least a first portion of the plurality of instructions;

(c) an instruction history cache having stored therein a plurality of predicted next instructions, each representing a predicted instruction to execute subsequent to one of the plurality of instructions; and (c) a processor coupled to the secondary cache and the instruction history cache, the processor including:

(1) a primary instruction cache coupled to the secondary cache and storing at least a second portion of the plurality of instructions, wherein the secondary instruction cache has an access time that is greater than that of the primary instruction cache;

(2) at least one execution unit configured to execute a first instruction from the plurality of instructions;

(3) a prefetch circuit arrangement configured to initiate retrieval, from the instruction history cache and the secondary instruction cache respectively, of predicted and actual next instructions to execute subsequent to the first instruction, the prefetch circuit arrangement further configured to supply the predicted next instruction to the execution unit for execution thereby subsequent to execution of the first instruction; and (4) a prediction verification circuit arrangement configured to receive the predicted and actual next instructions respectively from the instruction history cache and the secondary instruction cache and terminate execution of the predicted next instruction by the execution unit if the predicted and actual next instructions do not match.

19. A method of speculatively fetching instructions for execution by an execution unit coupled to a memory including primary and secondary instruction caches, with the secondary instruction cache having an access time that is greater than that of the primary instruction cache, the method comprising:
   (a) concurrently initiating retrieval, from an instruction history cache and the secondary instruction cache, of predicted and actual next instructions to execute subsequent to execution of a first instruction by the execution unit;
   (b) receiving the predicted next instruction from the instruction history cache and supplying the predicted next instruction to the execution unit for execution thereby; and
   (c) comparing the predicted next instruction received from the instruction history cache with the actual next instruction received from the secondary cache, and terminating execution of the predicted next instruction by the execution unit if the predicted and actual next instructions do not match.

20. A circuit arrangement, comprising:
   (a) a memory having stored therein a plurality of instructions, the memory including primary and secondary instruction caches, with the secondary instruction cache having an access time that is greater than that of the primary instruction cache;
   (b) an instruction history cache having stored therein a plurality of predicted next instructions, each representing a predicted instruction to execute at least two cycles subsequent to execution of an instruction in the memory;
   (c) at least one execution unit configured to begin execution of a first instruction from the memory, and thereafter to begin execution of a second instruction from the memory;
   (d) a prefetch circuit arrangement configured to prefetch a predicted next instruction for the second instruction from the instruction history cache concurrently with execution of the first instruction by the execution unit, wherein the prefetch circuit arrangement is further configured to initiate retrieval, from the instruction history cache and the secondary instruction cache respectively, of predicted and actual next instructions for the second instruction from the secondary instruction cache concurrently with prefetching the predicted next instruction, and to supply the predicted next instruction to the execution unit for execution thereby subsequent to execution of the first instruction; and
   (e) a prediction verification circuit arrangement configured to receive the predicted and actual next instructions respectively from the instruction history cache and the secondary instruction cache and terminate execution of the predicted next instruction by the execution unit if the predicted and actual next instructions do not match.

21. The circuit arrangement of claim 20, further comprising a history update circuit arrangement configured to store as the predicted next instruction for the second instruction an instruction actually executed the at least two cycles subsequent to the second instruction.

22. The circuit arrangement of claim 21, wherein the instruction history cache has an access time of N cycles, and wherein the history update circuit arrangement is configured to offset the predicted next instruction for the second instruction by N-1 instructions in the instruction history cache such that the predicted next instruction for the second instruction is accessed in the instruction history cache via an address of a third instruction executed N-1 cycles prior to the second instruction.

23. The circuit arrangement of claim 22, wherein the execution unit comprises an execution pipe comprising a plurality of stages, wherein the instruction history cache includes a write access port configured to store an instruction supplied at a data input at an address supplied at an address input, and wherein the history update circuit arrangement comprises a set of data lines electrically coupling an instruction register in one of the plurality of stages of the execution pipe to the data input of the write access port, and a set of address lines electrically coupling an address register in another of the plurality of stages of the execution pipe to the address input of the write access port, wherein the stage to which the set of data lines is coupled is offset by N-1 cycles from the stage to which the set of address lines is coupled.

24. A data processing system comprising the circuit arrangement of claim 20.

25. A program product, comprising a hardware definition program that defines the circuit arrangement of claim 20; and a signal bearing media bearing the hardware definition program.

26. A method of speculatively fetching instructions for execution by an execution unit coupled to a memory including primary and secondary instruction caches, with the secondary instruction cache having an access time that is greater than that of the primary instruction cache, the method comprising:
   (a) initiating execution of a first instruction from the memory by the execution unit;
   (b) after initiating execution of the first instruction, initiating execution of a second instruction from the memory by the execution unit;
   (c) concurrently initiating retrieval from an instruction history cache and the secondary instruction cache, of a predicted next instruction and an actual next instruction for the second instruction, respectively, and concurrently with execution of the first instruction by the execution unit, the instruction history cache having stored therein a plurality of predicted next instructions, each representing a predicted instruction to execute at least two cycles subsequent to execution of an instruction in the memory;
   (d) receiving the predicted next instruction from the instruction history cache and supplying the predicted next instruction to the execution unit for execution thereby; and
   (e) comparing the predicted next instruction received from the instruction history cache with the actual next instruction received from the secondary cache, and terminating execution of the predicted next instruction by the execution unit if the predicted and actual next instructions do not match.

27. A circuit arrangement, comprising:
   (a) a memory storing a plurality of instructions, wherein each instruction includes history data embedded therein that identifies a predicted next instruction to execute subsequent to execution of one of the plurality of instructions, wherein each of the plurality of instructions is a Very Long Instruction Word (VLIW) instruction including a plurality of parcels, with the history data therefor stored in at least one of the parcels;
   (b) at least one execution unit coupled to the memory, the execution unit configured to execute a first instruction stored in the memory; and (c) a prefetch circuit arrangement configured to initiate retrieval from the memory of the predicted next instruction identified by the history data of the first instruction concurrently with execution of the first instruction by the execution unit.

28. The circuit arrangement of claim 27, wherein the history address index for each instruction is stored in the last parcel of the instruction.

29. The circuit arrangement of claim 28, wherein each instruction in the plurality of instructions includes as the last parcel thereof one of a NOOP parcel and a branch parcel.

30. The circuit arrangement of claim 29, wherein any instruction having a branch parcel as the last parcel thereof includes a second branch parcel, wherein the branch parcels in any given instruction include branch to addresses that branch to the same cache line in the memory; whereby the branch to address for the branch parcel in the last parcel is replaced with the history address index therefor.

31. The circuit arrangement of claim 27, wherein the memory includes primary and secondary instruction caches, wherein the prefetch circuit arrangement is configured to initiate retrieval of the predicted next instruction identified by the history data of the first instruction by addressing the secondary cache using the history address index in the first instruction, wherein the secondary instruction cache has an access time in response to receiving the history address index of N cycles greater than an access time of the primary instruction cache.

32. The circuit arrangement of claim 31, wherein the history data for the first instruction identifies a predicted next instruction for a second instruction to be executed N cycles after the first instruction.

33. The circuit arrangement of claim 32, wherein the prefetch circuit arrangement is further configured to initiate execution of the predicted next instruction by the execution unit, the circuit arrangement further comprising:

(a) a prediction verification circuit configured to compare the addresses of the predicted next instruction and the actual next instruction executed subsequent to the second instruction and terminate execution of the predicted next instruction by the execution unit if the addresses of the predicted and actual next instructions do not match; and (b) a history update circuit arrangement configured to store as the history data for the first instruction an address index associated with the address of the actual next instruction executed subsequent to the second instruction.

34. The circuit arrangement of claim 33, wherein the execution unit comprises an execution pipe comprising a plurality of stages, wherein the primary instruction cache includes a write access port configured to store an address index supplied at a data input at an address supplied at an address input, and wherein the history update circuit arrangement comprises a set of data lines electrically coupling an instruction register in one of the plurality of stages of the execution pipe to the data input of the write access port, and a set of address lines electrically coupling an address register in another of the plurality of stages of the execution pipe to the address input of the write access port, wherein the stage to which the set of data lines is coupled is offset by N cycles from the stage to which the set of address lines is coupled.

35. The circuit arrangement of claim 33, wherein the execution unit comprises an execution pipe comprising a plurality of stages, wherein the primary instruction cache includes a write access port configured to store an address index supplied at a data input at an address supplied at an address input, and wherein the history update circuit arrangement further comprises a selector circuit arrangement interposed between the execution pipe and the primary instruction cache, the selector circuit configured to selectively couple at least one of the data input and the address input of the write access port to different stages of the execution pipe to controllably offset the predicted next instruction for the second instruction by one or more instructions in the instruction history cache in response to a selector input.

36. The circuit arrangement of claim 33, wherein each instruction in the primary cache has associated therewith a change indicator that indicates if the history data associated with the instruction has changed, the circuit arrangement further comprising an address compare block configured to set the change indicator for the first instruction if the addresses of the predicted and actual next instructions do not match.

37. The circuit arrangement of claim 36, further comprising a castout controller, coupled to the primary and secondary instruction caches, the castout controller configured to update the history data for a copy of the first instruction in the secondary instruction cache in response to replacement of a copy of the first instruction in the primary instruction cache when the change indicator for the first instruction is set.

38. A data processing system comprising the circuit arrangement of claim 27.

39. A program product, comprising a hardware definition program that defines the circuit arrangement of claim 27; and a signal bearing media bearing the hardware definition program.

40. A method of speculatively fetching instructions, the method comprising:

(a) executing a first instruction among a plurality of instructions stored in a memory, wherein the first instruction includes history data embedded therein that identifies a predicted next instruction to execute subsequent to execution of one of the plurality of instructions, and wherein each of the plurality of instructions is a Very Long Instruction Word (VLIW) instruction including a plurality of parcels, with the history data therefor stored in at least one of the parcels; and (b) concurrently with executing the first instruction, initiating retrieval from the memory of the predicted next instruction identified by the history data of the first instruction.

* * * * *

UNITED STATES PATENT AND TRADEMARK OFFICE
CERTIFICATE OF CORRECTION

PATENT NO.    : 6,230,260 B1
DATED         : May 8, 2001
INVENTOR(S)   : David Arnold Luick It is certified that error appears in the above-identified patent and that said Letters Patent is hereby corrected as shown below:

<u>Column 26, claim 26,</u>
Line 37, after "retrieval", insert -- , --.

Signed and Sealed this

Thirteenth Day of November, 2001

Attest:

*Attesting Officer*

NICHOLAS P. GODICI
*Acting Director of the United States Patent and Trademark Office*